(12) United States Patent
Kanda et al.

(10) Patent No.: US 6,643,026 B2
(45) Date of Patent: Nov. 4, 2003

(54) OPTICAL SYSTEM FOR OBLIQUE INCIDENCE INTERFEROMETER AND APPARATUS USING THE SAME

(75) Inventors: Hideo Kanda, Omiya (JP); Fumio Watanabe, Omiya (JP); Fumio Kobayashi, Omiya (JP)

(73) Assignee: Fuji Photo Optical Co., Ltd., Tokyo (JP)

( * ) Notice: Subject to any disclaimer, the term of this patent is extended or adjusted under 35 U.S.C. 154(b) by 345 days.

(21) Appl. No.: 09/779,634

(22) Filed: Feb. 9, 2001

(65) Prior Publication Data
US 2001/0017697 A1 Aug. 30, 2001

(30) Foreign Application Priority Data
Feb. 28, 2000 (JP) ........................................ 2000-050783

(51) Int. Cl.[7] ................................................. G01B 9/02
(52) U.S. Cl. ....................................................... 356/512
(58) Field of Search ................................. 356/512, 511, 356/489, 495, 521

(56) References Cited

U.S. PATENT DOCUMENTS

| | | | | |
|---|---|---|---|---|
| 4,325,637 A | * | 4/1982 | Moore | 356/512 |
| 4,498,771 A | * | 2/1985 | Makosch et al. | 356/495 |
| 6,226,092 B1 | * | 5/2001 | de Lega | 356/512 |

* cited by examiner

Primary Examiner—Samuel A. Turner
(74) Attorney, Agent, or Firm—Snider & Associates; Ronald R. Snider

(57) ABSTRACT

In an optical system for an oblique incidence interferometer, first and second prisms are used for luminous flux dividing and for luminous flux combining, respectively. Reference light and measurement light are separated from each other at a surface where collimated coherent light enters or exits from the first prism, whereas the reference light and measurement light are combined together at a surface where the measurement light enters or exits from the second prism.

14 Claims, 14 Drawing Sheets

EXAMPLE 1

EXAMPLE 2

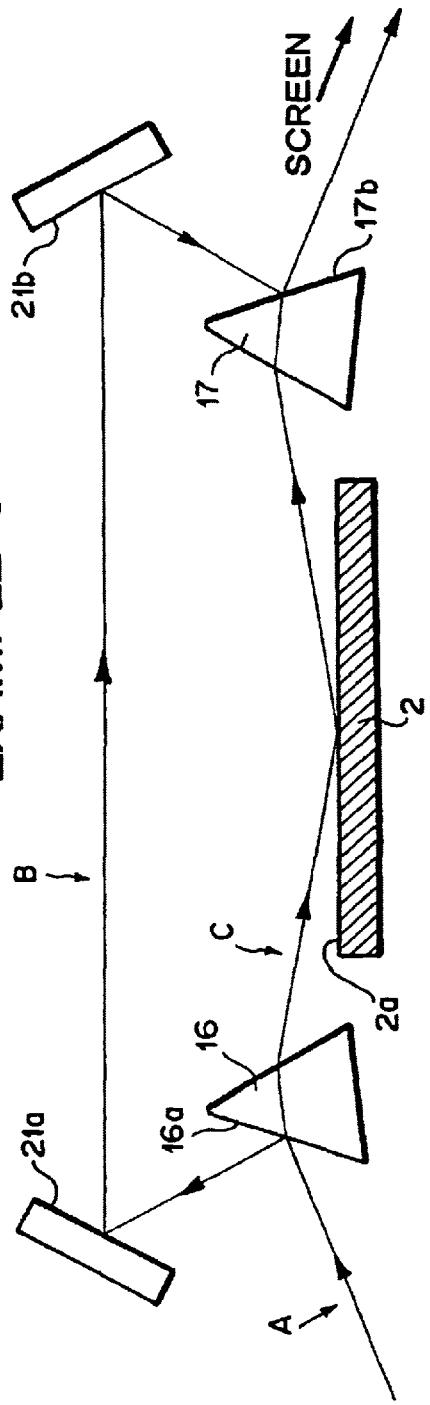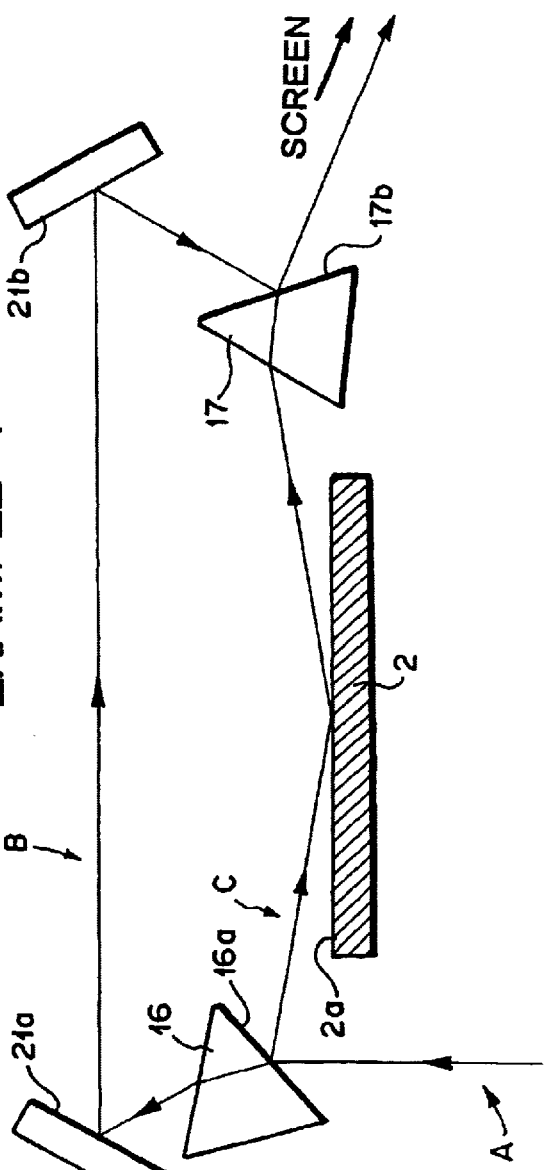

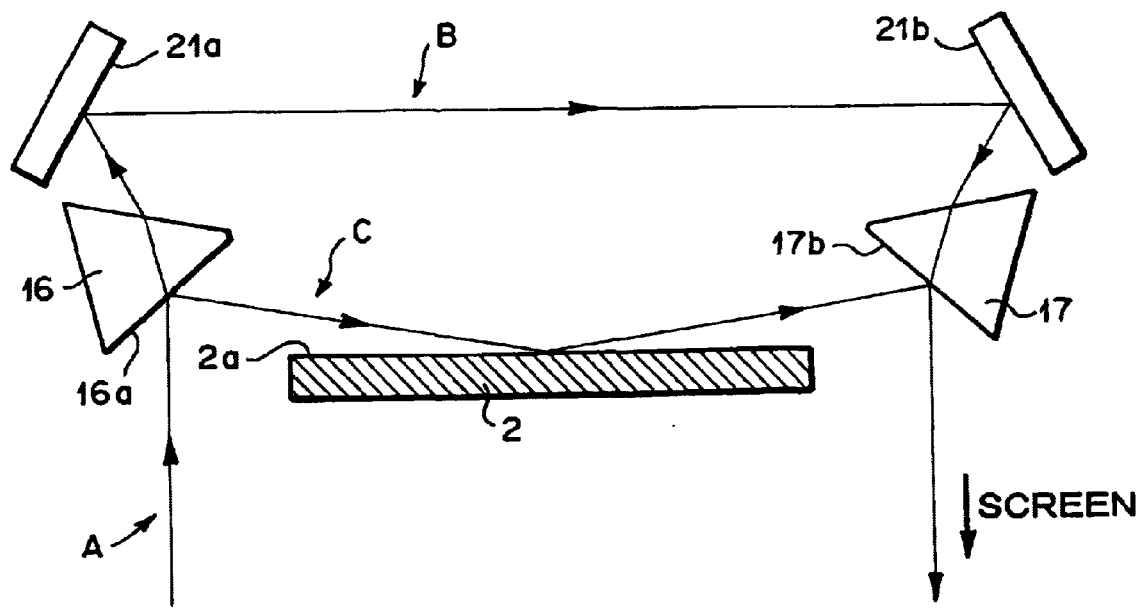
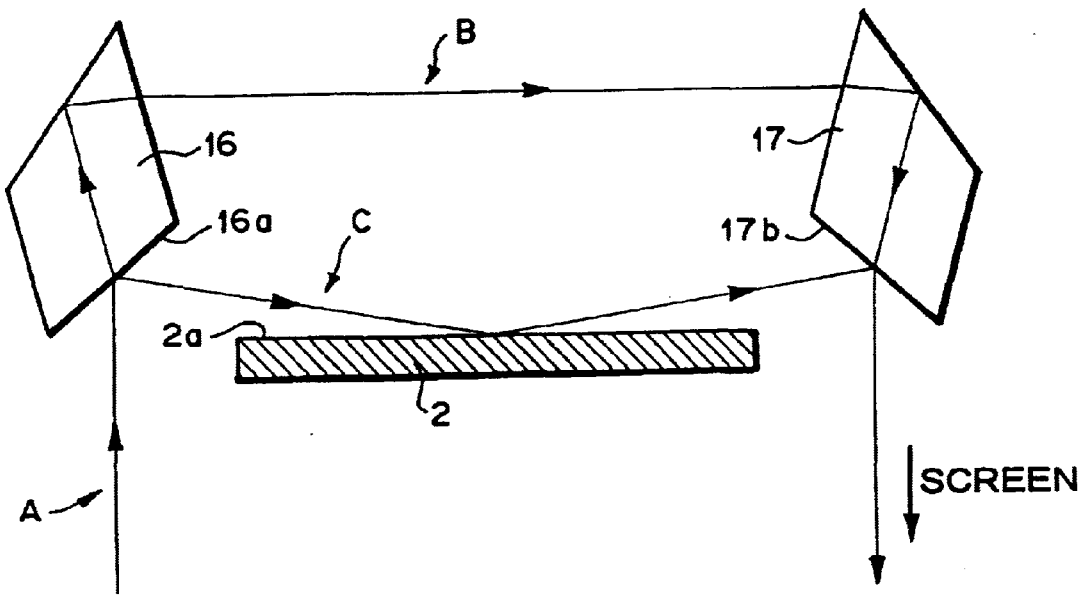

EXAMPLE 7

FIG.8 EXAMPLE 8

EXAMPLE 9

EXAMPLE 10

EXAMPLE 10

EXAMPLE 11

EXAMPLE 11

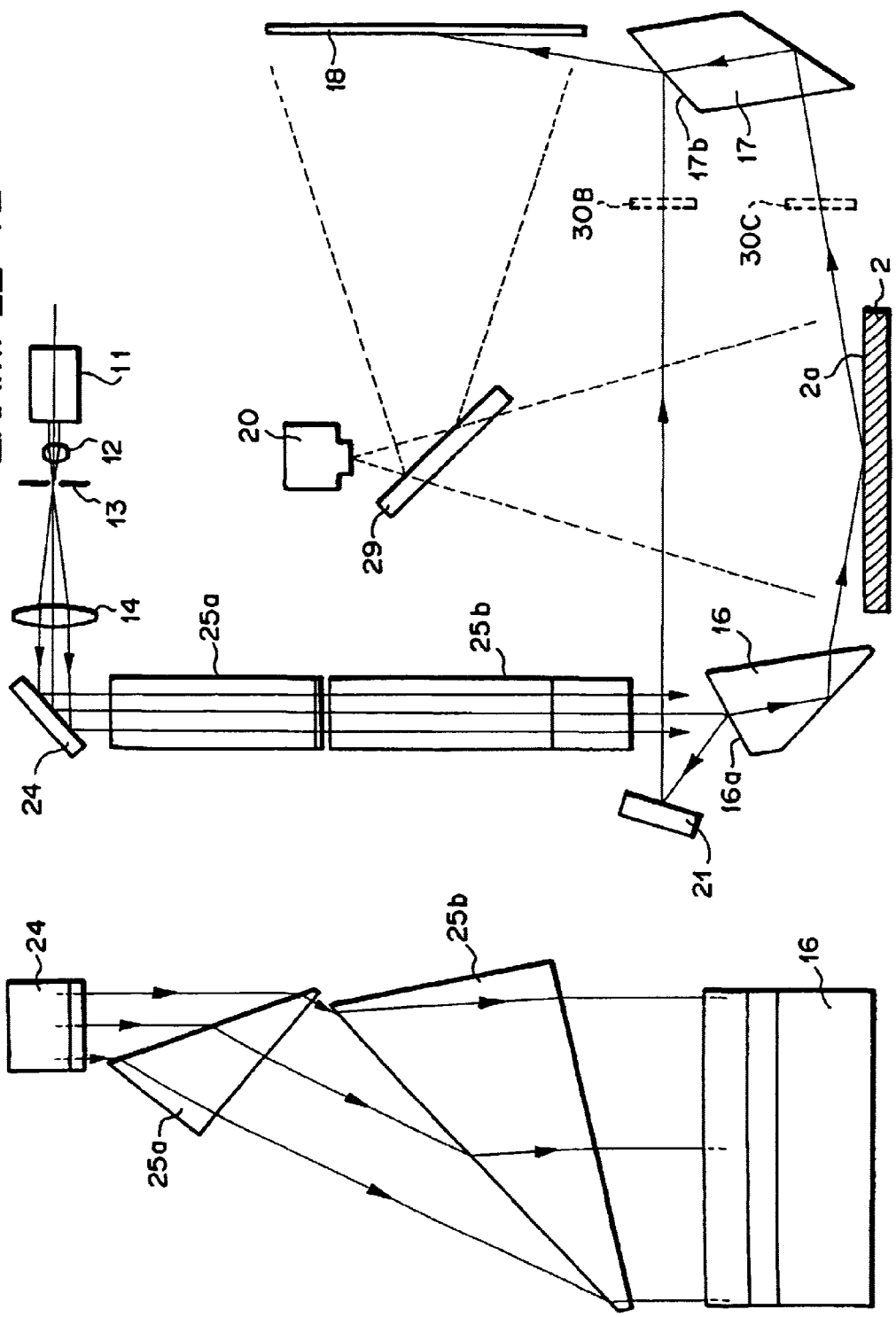

EXAMPLE 13

CONVENTIONAL EXAMPLE 1

CONVENTIONAL EXAMPLE 2

CONVENTIONAL EXAMPLE 3

CONVENTIONAL EXAMPLE 4

US 6,643,026 B2

OPTICAL SYSTEM FOR OBLIQUE INCIDENCE INTERFEROMETER AND APPARATUS USING THE SAME

RELATED APPLICATIONS

This application claims the priority of Japanese Patent Application No. 2000-050783 filed on Feb. 28, 2000, which is incorporated herein by reference.

BACKGROUND OF THE INVENTION

1. Field of the Invention

The present invention relates to an optical system used in an oblique incidence interferometer which makes it possible to measure the planarity of a rough surface, in particular, in a noncontact manner; and an apparatus using the same.

2. Description of the Prior Art

Conventionally, various interferometer apparatus for measuring the planarity of surfaces of processed products have been known. Among them, oblique incidence interferometer apparatus have been known as an apparatus which can measure the planarity of test surfaces having large irregularities.

The oblique incidence interferometer apparatus have been used for measuring the planarity of rough surfaces and the like in a noncontact manner, since their measuring sensitivity can be set lower by making a coherent light beam bundle obliquely incident on a test surface. Letting $\lambda$ be the wavelength of light used for measurement, and $\theta$ be the angle of incidence with respect to the test surface, the amount of irregularities of the test surface, i.e., the measuring sensitivity $\Delta$ is represented by the following expression:

$$\Delta h = \lambda/(2 \cos \theta)$$

Namely, as the incident angle $\theta$ becomes greater, so that the degree of oblique incidence increases, the fringe interval becomes longer, so that the measuring sensitivity lowers, whereby it becomes possible to measure surfaces having a low surface accuracy.

FIG. 14 shows a first configurational example of conventional oblique incidence interferometer apparatus, using a planar reference plate as a reference standard. In this oblique incidence interferometer apparatus, a reference plane 116a of a plane parallel plate 116 and a test surface 2a of a sample 2 are disposed so as to oppose each other. Coherent light emitted from a laser light source 111 is turned into parallel light by a collimator lens 114 and obliquely irradiates the reference plane 116a. Interference fringes corresponding to the optical path difference based on the distance between the reference plane 116a and test surface 2a are projected onto a screen 118, so as to be viewed by an observer 119. In this example, as shown in FIG. 14, reference light and measurement light are separated from each other at the reference plane 116a and then are combined together at this plane.

FIG. 15 is a second configurational example of conventional oblique incidence interferometer apparatus, which is an example known as Abramson type using a right isosceles triangle prism as a reference standard. In FIG. 15 and its subsequent conventional examples, members similar to those of the oblique incidence interferometer apparatus shown in FIG. 14 are referred to with numerals whose lower two digits are the same as those of their equivalents in FIG. 14. In this apparatus, coherent parallel light is made incident on a right isosceles triangle prism 216 from an entrance surface 216b. As in the above-mentioned first example, reference light and measurement light are separated from each other at a reference plane 216a and then are combined together at this plane. This apparatus is configured such that interference fringes projected on a screen 218 are captured by a TV camera 219 so as to be viewed.

FIG. 16 shows a third configurational example of conventional oblique incidence interferometer apparatus, which is an example known as Birch type, using diffraction gratings.

In this oblique incidence interferometer apparatus, coherent parallel light is made incident on a diffraction grating 317a, so that its wavefront is divided into two directions. One of thus obtained light beam bundles is made obliquely incident on a test surface 2a, and the resulting reflected light is used as measurement light, whereas the other light beam bundle is used as reference light. The measurement light and reference light are made incident on a diffraction grating 317b, so as to combine their wavefronts together. Interference fringes generated by the optical interference between the measurement light and reference light emitted from the diffraction grating 317b in the same direction are projected onto a hologram screen 318, and are captured by a TV camera 319 so as to be viewed. In FIG. 16, the zero-order diffracted light subjected to wavefront division at the diffraction grating 317a is used as the reference light, whereas the first-order diffracted light is used as the measurement light. The first-order diffracted light of reference light and the zero-order light of measurement light are combined together at the diffraction grating 317b in a later stage, so as to interfere with each other.

FIG. 17 is a fourth configurational example of conventional oblique incidence interferometer apparatus, which is an example employing a Mach-Zehnder type interferometer as an oblique incidence interferometer.

In this oblique incidence interferometer apparatus, coherent parallel light is divided into two directions by a half mirror 417a. One of thus obtained light beam bundles is used as measurement light so as to be made obliquely incident on a test surface 2a by way of a mirror 415a, whereas the other light beam bundle is used as reference light. The measurement light reflected by the test surface 2a and the reference light reflected by the mirror 415b are combined together by a half mirror 417b. Interference fringes generated by optical interference between the measurement light and reference light are projected onto a screen 418, so as to be viewed directly or by use of a TV camera and the like.

Though optical systems for oblique incidence interferometers having various configurations and apparatus using the same have conventionally been proposed as mentioned above, the optical systems and apparatus have their own problems.

Functions required for the optical systems for oblique incidence interferometers and apparatus include easiness in viewing the interference fringes formed. One of causes obstructing the viewing is interference noise.

For example, in the configuration of the first conventional example, interference noise is likely to occur due to the reflected light at a surface (which may be an entrance or exit surface) of the planar plate other than the reference plane. This interference noise can be reduced to a certain extent if the surface is provided with an antireflection coating. Since the angle of incidence is large, however, a coating having a low reflectivity is hard to provide.

The apparatus of the second conventional example can prevent the interference noise from occurring due to such surface reflection. Nevertheless, a problem of interference noise caused by multi-reflected light between the test surface and reference plane remains even in such a configuration. For eliminating this problem, the multi-reflected light between the test surface and reference plane and the light internally reflected by the reference plane should be prevented from interfering with each other and reaching the screen surface. In order to prevent this from happening with a relative arrangement of optical members, if will be effective if the reference plane is set to a size at least twice that of the test surface, for example. The conventional configurational example using the right isosceles triangle prism 216 is problematic in that the prism 216 itself becomes very large, heavy, and expensive in order to enlarge the reference plane 216a as such.

There is also a problem that the luminous flux internally reflected by the reference plane 216a of prism 216 is emitted into the same direction as the interfering light, whereby the noise caused by this internally reflected light is superimposed on the screen 218.

Since the third conventional example utilizes a diffraction grating, there is a fear of unnecessary orders of diffracted light becoming noise light. Therefore, in order to take out only necessary orders of diffracted light, a method of forming an image of interference fringes by use of a relay lens is employed in practice.

Even in a configuration using half mirrors 417a, 417b as in the fourth conventional example, interference noise occurs due to multiple reflections between the front and back surfaces of each half mirror 417a, 417b and is hard to eliminate.

The third conventional example in which light utilization efficiency becomes worse due to the use of diffraction grating, for example, is problematic not only due to the interference noise but also in terms of easiness in viewing.

The first and second conventional examples in which the reference plane 116a, 216a is disposed considerably close to the test surface 2a although not in contact therewith, for example, are more restrictive in terms of installing conditions and viewing, whereby the easiness in viewing is likely to deteriorate. The case where the reference plane 116a, 216a is disposed as such is also problematic in terms of configuration in that attention is required when aligning the test surface 2a.

Further, the optical system and the apparatus as a whole are desired to be made compact.

For example, though the luminous flux directed from the collimator lens 214 to the test surface 2a in the second conventional example must cover both the incident light and reference light components with respect to the test surface 2a, the incident angle with respect to the prism entrance surface 216a is small in this conventional configurational example using the right isosceles triangle prism 216, whereby a parallel luminous flux having a large luminous flux diameter is required to be made incident. Therefore, the collimator lens 214 also becomes larger, whereby the interferometer as a whole inevitably increases its size.

In the third conventional example, a large quantity of light is lost due to the use of diffraction gratings, whereby a hologram screen or the above-mentioned relay lens is used for favorably viewing the interference fringes, which may increase the size and cost of the apparatus.

SUMMARY OF THE INVENTION

In view of such circumstances, it is an object of the present invention to provide an optical system for an oblique incidence interferometer, whose light quantity loss and interference noise are low, which is easy to view interference fringes and carry out alignment, and can make the optical system and the whole apparatus compact; and an apparatus using the same.

The present invention provides an optical system for an oblique incidence interferometer, in which collimated coherent light is divided by luminous flux dividing means, one of thus obtained luminous fluxes is used as reference light, the other luminous flux is used as measurement light made obliquely incident on a test surface, the reference light and the measurement light reflected by the test surface are combined together by luminous flux combining means so as to interfere with each other, and thus generated interference fringes are formed on an interference fringe observing screen;

wherein the luminous flux dividing means comprises a first prism, the reference light and measurement light being separated from each other at a surface where the coherent light enters the first prism or a surface where the coherent light exits from the first prism; and wherein the luminous flux combining means comprises a second prism, the reference light and measurement light being combined together at a surface where the measurement light enters the second prism or a surface where the measurement light exits from the second prism.

The apparatus in accordance with the present invention comprises the optical system for an oblique incidence interferometer, and a camera.

Here, "a surface where the coherent light exits from the first prism" refers to a surface from which the coherent light exits in the case where it has entered the first prism without being divided at the entrance surface of the first prism.

BRIEF DESCRIPTION OF THE DRAWINGS

FIG. 3 is a view showing the configuration of the optical system for an oblique incidence interferometer in accordance with Example 3 of the present invention;

FIG. 4 is a view showing the configuration of the optical system for an oblique incidence interferometer in accordance with Example 4 of the present invention;

FIG. 5 is a view showing the configuration of the optical system for an oblique incidence interferometer in accordance with Example 5 of the present invention;

FIG. 6 is a view showing the configuration of the optical system for an oblique incidence interferometer in accordance with Example 6 of the present invention;

FIGS. 12A and 12B are views showing the configuration of the apparatus using an optical system for an oblique incidence interferometer in accordance with Example 12 of the present invention;

DESCRIPTION OF THE PREFERRED EMBODIMENTS

In the following, an embodiment of the present invention will be explained with reference to the drawings.

Figure 1:
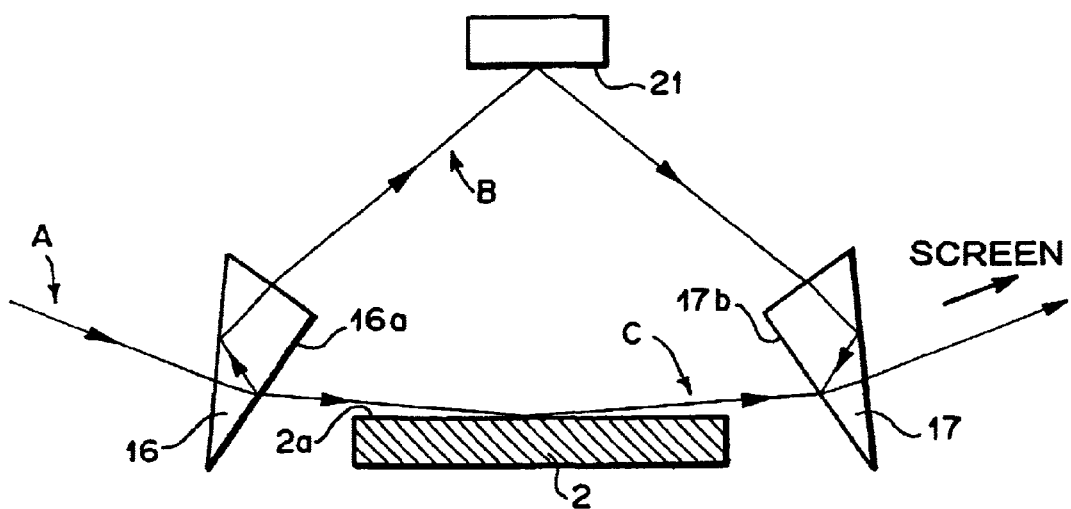
FIG. 1 is a view showing the configuration of the optical system for an oblique incidence interferometer in accordance with Example 1 of the present invention.

FIG. 1 is a side view showing the optical system for an oblique incidence interferometer in accordance with Example 1 which will be explained later. In this optical system, collimated coherent light A is divided by luminous flux dividing means, one of thus obtained luminous fluxes is used as reference light B, the other luminous flux is used as measurement light C made obliquely incident on a test surface 2a, the reference light B and the measurement light C reflected by the test surface 2a are combined together by luminous flux combining means so as to interfere with each other, and thus generated interference fringes are formed on an interference fringe observing screen (not depicted). The luminous flux dividing means comprises a single first prism 16, whereas the reference light B and measurement light C are separated from each other at a surface where the coherent light enters the first prism 16 or a surface where the coherent light exits from the first prism 16. The luminous flux combining means comprises a single second prism 17, whereas the reference light B and measurement light C are combined together at a surface where the measurement light C enters the second prism 17 or a surface where the measurement light C exits from the second prism 17.

Operations and effects of this embodiment will now be explained.

Since prisms are used as the luminous flux dividing means and luminous flux combining means, noise light can be reduced by this embodiment. The prisms 16 and 17 do not have surfaces which are parallel to surfaces where the reference light and measurement light are separated from each other or combined together. Therefore, influences of interference noise light caused by multiple reflections in such surfaces, which may become problematic in the case using a plane parallel plate or half mirror, can be reduced, whereby favorable interference fringe images can be obtained.

Also, since prisms are used as the luminous flux dividing means and luminous flux combining means, the light quantity loss becomes smaller than that in the case where a diffraction grating is used for dividing and combining luminous fluxes (necessitating two half mirrors each), whereby viewing becomes easier.

Further, since prisms are used as the luminous flux dividing means and luminous flux combining means, the optical positional adjustment of these members becomes easier than that in the case where half mirrors are used for dividing and combining luminous fluxes, which is advantageous in terms of manufacturing cost as well.

In a configuration such as that of this embodiment, it is not necessary to dispose a reference plane (e.g., 116a of the first conventional example or 216a of the second conventional example) considerably close to the test surface 2a as in the first and second conventional examples), whereby the alignment of test surface 2a becomes easier. Also, it is less restricted in terms of installing conditions and viewing.

Since no reference plane is necessary, a space can be secured above the test surface 2a in the drawing, whereby the test surface 2a can directly be observed as well. If the test surface 2a is directly observed, then the position of sample 2 and the surface state of test surface 2a such as damages thereof can be seen. If the test surface 2a is illuminated with light having a directivity parallel to the test surface 2a, then damages and the like can be seen more easily in surface inspections of the test surface 2a.

Since favorable interference fringe images can be obtained without using a large rectangular isosceles triangle prism in order to yield a reference plane 216a with a large size as in the second conventional example or without adding members thereto as in the third conventional example, the optical system and the whole apparatus can be made compact, and the cost cutting effect is large.

In the following, examples of the present invention will be explained. Examples 1 to 8 are examples of optical system for an oblique incidence interferometer in accordance with this embodiment, whereas Examples 9 to 13 are examples of apparatus using the optical system for an oblique incidence interferometer in accordance with this embodiment. Among the examples, members similar to each other will be referred to with numerals or letters identical to each other without repeating explanations concerning the overlapping parts.

EXAMPLE 1

As shown in FIG. 1, the optical system for an oblique incidence interferometer in accordance with Example 1 is configured such that the coherent collimated light A is divided into reference light B and measurement light C at a surface where the coherent collimated light A exits from the first prism 16, whereas the reference light B and measurement light C are combined together at a surface where the measurement light C enters the second prism 17. In the optical path of reference light B, a mirror 21 is disposed.

At the luminous flux dividing surface 16a, the collimated light A incident on the first prism 16 is divided into the measurement light C straightly transmitted and emitted therethrough, and the reference light B regularly reflected within the prism 16. The measurement light C is reflected by the test surface 2a, so as to enter the second prism 17. On the other hand, the reference light B is regularly reflected once again within the prism 16 before being emitted therefrom. Thus emitted reference light B is regularly reflected by the mirror 21, so as to enter the second prism 17. After being regularly reflected once within the second prism 17 and then once regularly reflected by the luminous flux combining surface 17b, the reference light B is combined with the measurement light C straightly transmitted through this surface, so as to be emitted toward a screen.

Thus, during the period of time from the dividing at the first prism 16 until the combining at the second prism 17 in this example, the number of reflections (including the reflections at the luminous flux dividing surface 16a and luminous flux combining surface 17b, ditto in the following examples) is 5 in the reference light B, and 1 in the measurement light C.

Since the number of reflections is odd in each of the reference light B and measurement light C after the dividing at the first prism 16 until the combining at the second prism 17 as such, the same or similar luminous flux parts of the collimated light emitted from the collimator lens are combined together. Thus, luminous flux components which are likely to generate interference are combined together, whereby interference can be generated even if the incident collimated light is not strictly a plane wave. Consequently, greater tolerances can be attained with respect to the alignment of individual members from the light source to the first prism 16 and errors in the light source light, whereby it is advantageous in that cost reduction and manufacture become easier.

EXAMPLE 2

Figure 2:
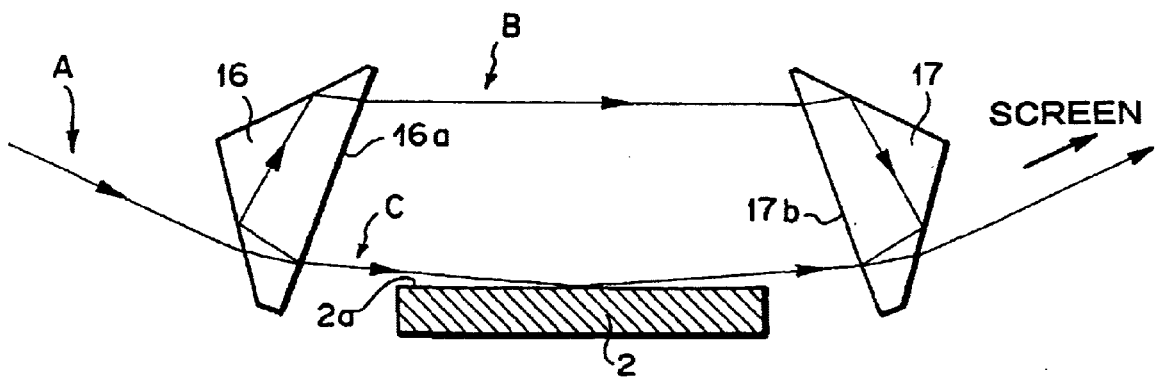
FIG. 2 is a view showing the configuration of the optical system for an oblique incidence interferometer in accordance with Example 2 of the present invention.

As shown in FIG. 2, the optical system for an oblique incidence interferometer in accordance with Example 2 is configured such that the coherent collimated light A is divided into reference light B and measurement light C at a surface where the coherent collimated light A exits from the first prism 16, whereas the reference light B and measurement light C are combined together at a surface where the measurement light C enters the second prism 17.

At the luminous flux dividing surface 16a, the collimated light A incident on the first prism 16 is divided into the measurement light C straightly transmitted and emitted therethrough, and the reference light B regularly reflected within the prism 16. The measurement light C is reflected by the test surface 2a, so as to enter the second prism 17. On the other hand, the reference light B is regularly reflected twice thereafter within the prism 16 before being emitted therefrom. Thus emitted reference light B enters the second prism 17. After being regularly reflected twice within the second prism 17 and then regularly reflected once again by the luminous flux combining surface 17b, the reference light B is combined with the measurement light C straightly transmitted through this surface, so as to be emitted toward a screen.

This example is an optical system for an oblique incidence interferometer, which has a smaller number of members and thus is excellent in compactness and cost cutting.

EXAMPLE 3

As shown in FIG. 3, the optical system for an oblique incidence interferometer in accordance with Example 3 is configured such that the coherent collimated light A is divided into reference light B and measurement light C at a surface where the coherent collimated light A enters the first prism 16, whereas the reference light B and measurement light C are combined together at a surface where the measurement light C exits from the second prism 17. In the optical path of reference light B, mirrors 21a and 21b are disposed.

At the luminous flux dividing surface 16a of first prism 16, the collimated light A is divided into the measurement light C straightly transmitted and emitted therethrough so as to enter the first prism 16, and the reference light B regularly reflected thereby. The measurement light C emitted from the first prism 16 is reflected by the test surface 2a, so as to enter the second prism 17. On the other hand, the reference light B is regularly reflected by the mirrors 21a and 21b and then is regularly reflected by the luminous flux combining surface 17b of second prism 17, where it is combined with the measurement light C straightly transmitted and emitted through this surface, so as to be directed to a screen.

EXAMPLE 4

As shown in FIG. 4, the optical system for an oblique incidence interferometer in accordance with Example 4 is configured such that the coherent collimated light A is divided into reference light B and measurement light C at a surface where the coherent collimated light A enters the first prism 16, whereas the reference light B and measurement light C are combined together at a surface where the measurement light C exits from the second prism 17. In the optical path of reference light B, mirrors 21a and 21b are disposed.

At the luminous flux dividing surface 16a of first prism 16, the collimated light A is divided into the measurement light C regularly reflected thereby and the reference light B straightly transmitted therethrough so as to enter the first prism 16. The measurement light C is reflected by the test surface 2a, so as to enter the second prism 17. On the other hand, the reference light B is emitted from the first prism 16, so as to be regularly reflected by the mirrors 21a and 21b and then regularly reflected by the luminous flux combining surface 17b of second prism 17, where it is combined with the measurement light C straightly transmitted and emitted through this surface, so as to be directed to a screen.

Though this example has a configuration substantially the same as that of Example 3, the collimated light A incident on the first prism 16 has a direction different from that in Example 3.

EXAMPLE 5

As shown in FIG. 5, while Example 5 has a configuration substantially the same as that of Example 3, the direction of the collimated light A incident on the first prism 16 and the direction in which composite light carrying interference fringes is emitted differ from those in Example 3.

At the luminous flux dividing surface 16a of first prism 16, the collimated light A is divided into the measurement light C regularly reflected thereby and the reference light B straightly transmitted therethrough so as to enter the first prism 16. The measurement light C is reflected by the test surface 2a, so as to enter the second prism 17. On the other hand, the reference light B is transmitted through the first prism 16, so as to be regularly reflected by the mirrors 21a and 21b and then enter the second prism 17. At the luminous flux combining surface 17b of second prism 17, the reference light B is combined with the measurement light C regularly reflected by this surface, so as to be emitted toward a screen.

EXAMPLE 6

As shown in FIG. 6, Example 6 is a configurational example modifying Example 5.

At the luminous flux dividing surface 16a of first prism 16, the collimated light A is divided into the measurement light C regularly reflected thereby and the reference light B straightly transmitted therethrough so as to enter the first prism 16. The measurement light C is reflected by the test surface 2a, so as to be directed to the second prism 17. On the other hand, the reference light B is regularly reflected once within the first prism 16 and then enters the second prism 17, so as to be regularly reflected once within the second prism 17. Thereafter, at the luminous flux combining surface 17b, the reference light B is combined with the measurement light C regularly reflected by this surface, so as to be emitted toward a screen.

In this example, the forms of prisms 16 and 17 are changed so that the reflections effected by the mirrors 21a and 21b in Example 5 are carried out within the prisms 16 and 17. In such a configuration, the number of members is cut down, whereby alignment becomes easier.

EXAMPLE 7

Figure 7:
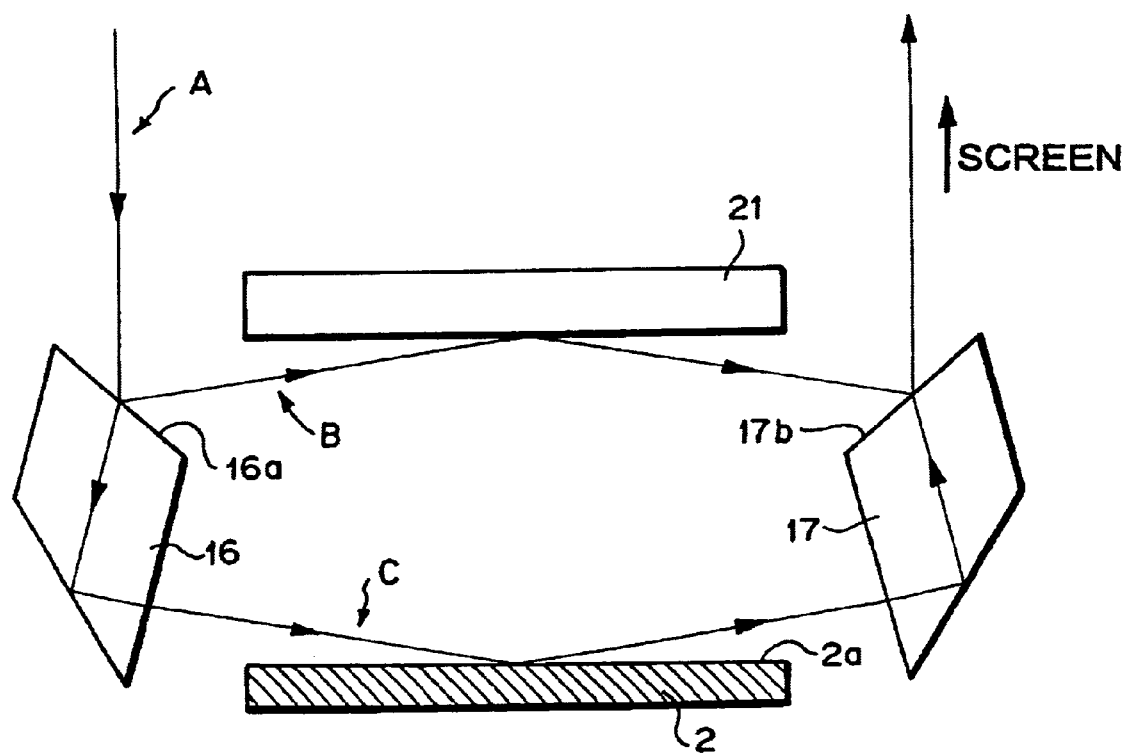
FIG. 7 is a view showing the configuration of the optical system for an oblique incidence interferometer in accordance with Example 7 of the present invention.

As shown in FIG. 7, the optical system for an oblique incidence interferometer in accordance with Example 7 is configured such that the coherent collimated light A is divided into reference light B and measurement light C at a surface where the coherent collimated light A enters the first prism 16, whereas the reference light B and measurement light C are combined together at a surface where the measurement light C exits from the second prism 17. In the optical path of reference light B, a mirror 21 is disposed.

At the luminous flux dividing surface 16a of first prism 16, the collimated light A is divided into the measurement light C straightly transmitted therethrough so as to enter the first prism 16, and the reference light B regularly reflected thereby. The measurement light C is once regularly reflected within the first prism 16 and then is emitted therefrom. Thus emitted measurement light C is reflected by the test surface 2a, so as to enter the second prism 17. On the other hand, the reference light B is regularly reflected by the mirror 21, and then is regularly reflected at the luminous flux combining surface 17b of second prism 17, where the reference light B is combined with the measurement light C emitted after being once regularly reflected within the second prism 17, so as to be directed to a screen.

Thus, during the period of time from the dividing at the first prism 16 until the combining at the second prism 17 in this example, the number of reflections is 3 in each of the reference light B and the measurement light C. Since the number of reflections is odd in each of the reference light B and measurement light C after the dividing at the first prism 16 until the combining at the second prism 17 as such, the tolerance for errors in collimated light becomes greater as in Example 1.

This example differs from Examples 3 to 6 in the direction of collimated light A incident on the first prism 16 and the direction in which composite light carrying interference fringes is emitted.

EXAMPLE 8

Figure 8:
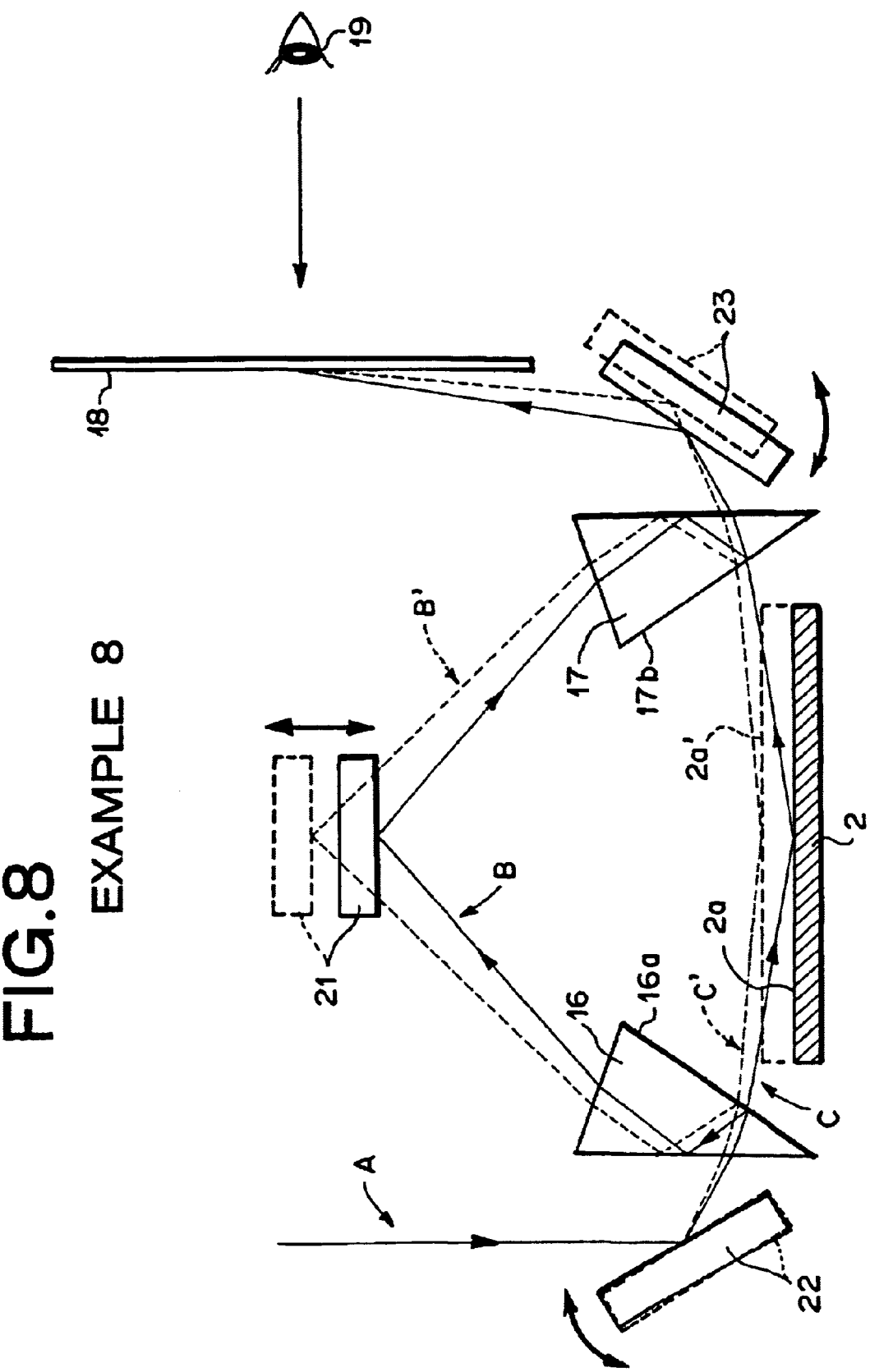
FIG. 8 is a view showing the configuration of the optical system for an oblique incidence interferometer in accordance with Example 8 of the present invention.

As shown in FIG. 8, the configuration of Example 8 from the first prism 16 to the second prism 17 is substantially the same as that of Example 1. In this example, a rotatable mirror 22 for changing the incident angle is disposed upstream the first prism 16 so as to make it possible to change the angle at which the measurement light C is incident on the test surface 2a, whereas a mirror 23 is disposed downstream the second prism 17 as an optical path adjusting means for adjusting the optical path such that interference fringes are formed at a predetermined position of an interference fringe observing screen 18 in response to the change in incident angle of the measurement light C onto the test surface 2a caused by the mirror 22.

If the angle at which the measurement light C is incident on the test surface 2a is changed as such, then the sensitivity of interference fringes formed by this optical system can be made variable. If the sensitivity of interference fringes is easily made variable, the optical system can respond to test surfaces 2a having a variety of surface accuracy, for example, by lowering the fringe sensitivity so as to make it possible to measure a rough surface.

The mirror 22 is rotatable as indicated by arrows in FIG. 8, thereby changing the incident angle with respect to the test surface 2a. The reference light B and measurement light C in the case where the mirror 22 is rotated are indicated by broken lines B' and C', respectively. Here, the sample 2 is adjusted such that the test surface 2a moves to the position indicated by the broken line 2a'. Also, since the mirror 22 is disposed upstream the first prism 16 in this example, the optical path of reference light B is changed. Therefore, it is desirable that members in the optical path of reference light B, such as the mirror 21 in this embodiment, be movable in response thereto.

Further, it is desirable that members downstream the test surface 2a be movable in response to the changes in optical paths of the reference light B and measurement light C when necessary. For instance, the mirror 23 is movable as indicated by arrows in FIG. 8 in this example, whereby interference fringe images can be projected without moving the screen 18 when the position and orientation of mirror are changed as such even if the optical path of the luminous flux carrying interference fringes changes as the mirror 22 rotates.

Here, the mirror 23 also moves so as to adjust the optical path such that interference fringes are formed at a predetermined position in the interference fringe observing screen 18 as shown in FIG. 8. As a consequence, the position of interference fringe images on the screen 18 does not change even if the sensitivity of interference fringes changes, whereby viewing becomes easier. Further, since the mirror 23 moves such that the composite light carrying interference fringes is made incident on the screen 18 at an angle identical to the incident angle of the measurement light C or C' onto the test surface 2a, an observer 19 can view distortion-free interference fringe images on the screen 18 at any sensitivity of interference fringes changed.

Thus, while changing the fringe sensitivity, interference fringe images are formed at a predetermined position on the screen 18 even when the fringe sensitivity is changed, and can be observed without distortion.

EXAMPLE 9

Figure 9:
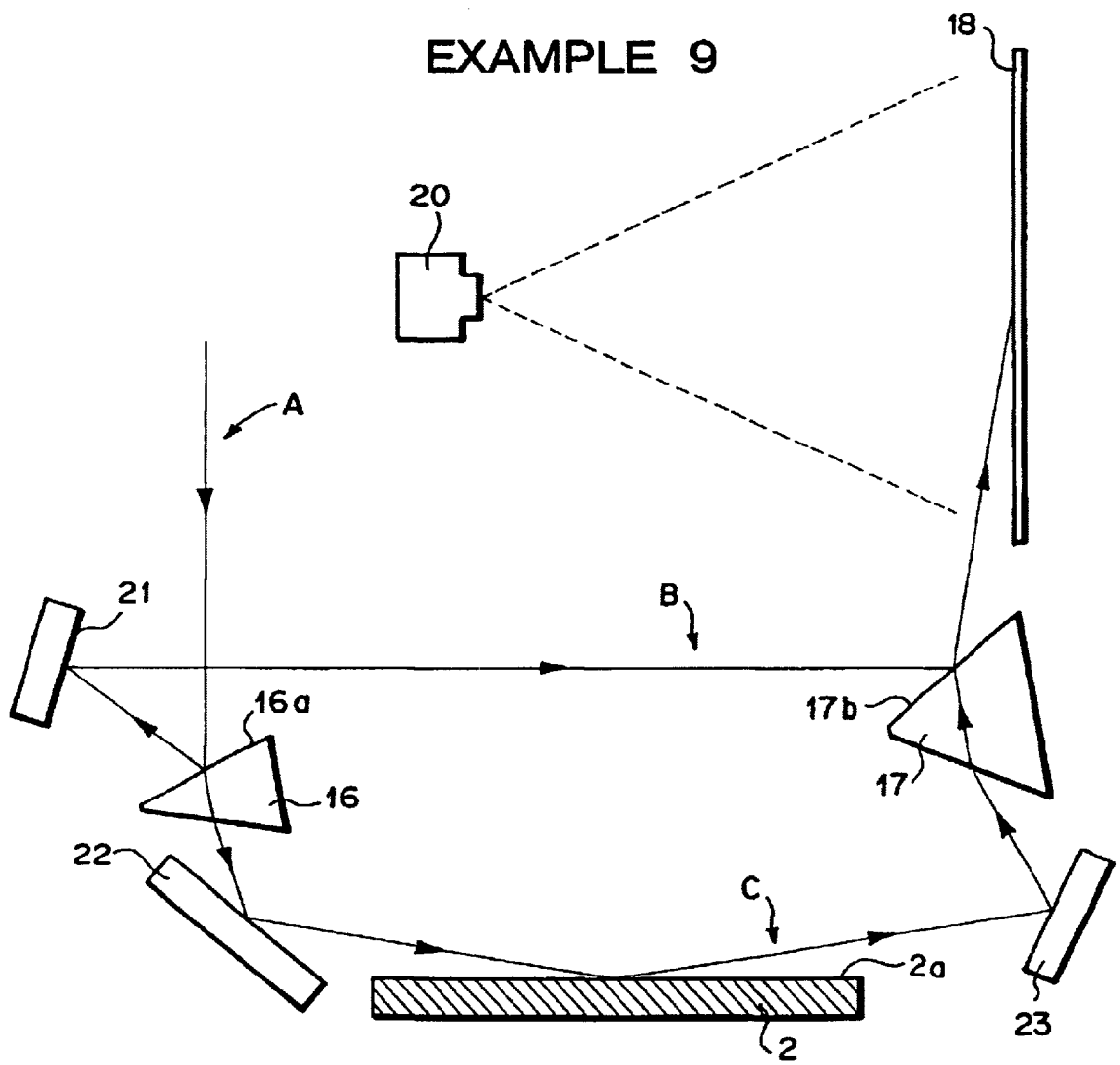
FIG. 9 is a view showing the configuration of the apparatus using an optical system for an oblique incidence interferometer in accordance with Example 9 of the present invention.

FIG. 9 is a view showing the configuration of an apparatus equipped with the optical system for an oblique incidence interferometer in accordance with this embodiment. This oblique incidence interferometer apparatus 10 is an apparatus for measuring the surface form of the test surface 2a of sample 2 by utilizing interference fringes formed by an interference action of light; and is constituted by the optical system for an oblique incidence interferometer in accordance with this embodiment, and a TV camera 20 disposed at a position where interference fringes formed on an interference fringe observing screen 18 of this optical system are viewable.

The optical system for an oblique incidence interferometer in accordance with this example is mostly common with the optical system explained as Example 7. Namely, this optical system is configured such that the coherent collimated light A is divided into reference light B and measurement light C at a surface where the coherent collimated light A enters the first prism 16, whereas the reference light B and measurement light C are combined together at a surface where the measurement light C exits from the second prism 17.

At the luminous flux dividing surface 16a of first prism 16, the collimated light A is divided into the measurement light C straightly transmitted therethrough so as to enter the first prism 16, and the reference light B regularly reflected thereby. The measurement light C is transmitted through the first prism 16, and then is successively reflected by the mirror 22, the test surface 2a, and the mirror 23, so as to enter the second prism 17. On the other hand, the reference light B is regularly reflected by the mirror 21, and then is regularly reflected at the luminous flux combining surface 17b of second prism 17, where the reference light B is combined with the measurement light C emitted from the second prism 17, whereby the composite light carrying interference fringe information projects interference fringe images onto the screen 18.

Thus, during the period of time from the dividing at the first prism 16 until the combining at the second prism 17 in this example, the number of reflections is 3 in each of the reference light B and the measurement light C. Since the number of reflections is odd in each of the reference light B and measurement light C, the tolerance for errors in collimated light becomes greater as in Example 1.

On the other hand, this example is configured such that, as shown in FIG. 9, the reference light B divided at the first prism 16 is directed to the left side away from the second prism 17 in the drawing as compared with the optical system of Example 7. The reference light B and measurement light C can have optical path lengths substantially equal to each other after being divided at the first prism 16 until they are combined together at the second prism 17. If these two optical path lengths are substantially equal to each other, then interference fringes can be formed more easily even when light having a shorter coherence length is used. Therefore, this example is an effective configuration even when light having a shorter coherence length is used as a light source for measurement.

Meanwhile, this apparatus is configured such that interference fringe images can be viewed through the TV camera 20. Since a camera is used, the camera sensitivity can be enhanced when interference fringe images are darker, so as to facilitate viewing. Also, it becomes easier to analyze images.

Further, if the field of view of this camera is made variable upon zooming or switching, then interference fringe images can be viewed while being enlarged (or reduced) on a monitor (not depicted) even when the area of sample surface 2a is smaller (or larger).

If the apparatus of this example is equipped with an image processing function which evaluates distortions generated by lenses mounted to this camera and then carries out image processing so as to correct the distortions, then it can carry out further favorable interference fringe viewing. While such a camera often uses a wide-angle lens so as to make the apparatus compact, distortions become greater when the wide-angle lens is used. Therefore, in order to eliminate distortions of camera lenses, the image processing such as that mentioned above is carried out before interference fringes are displayed on the monitor or analyzed. Consequently, interference fringe images free from the influence of distortions caused by camera lenses can be observed on the monitor, and the interference fringes can be analyzed with a high accuracy.

EXAMPLE 10

Figure 10B:
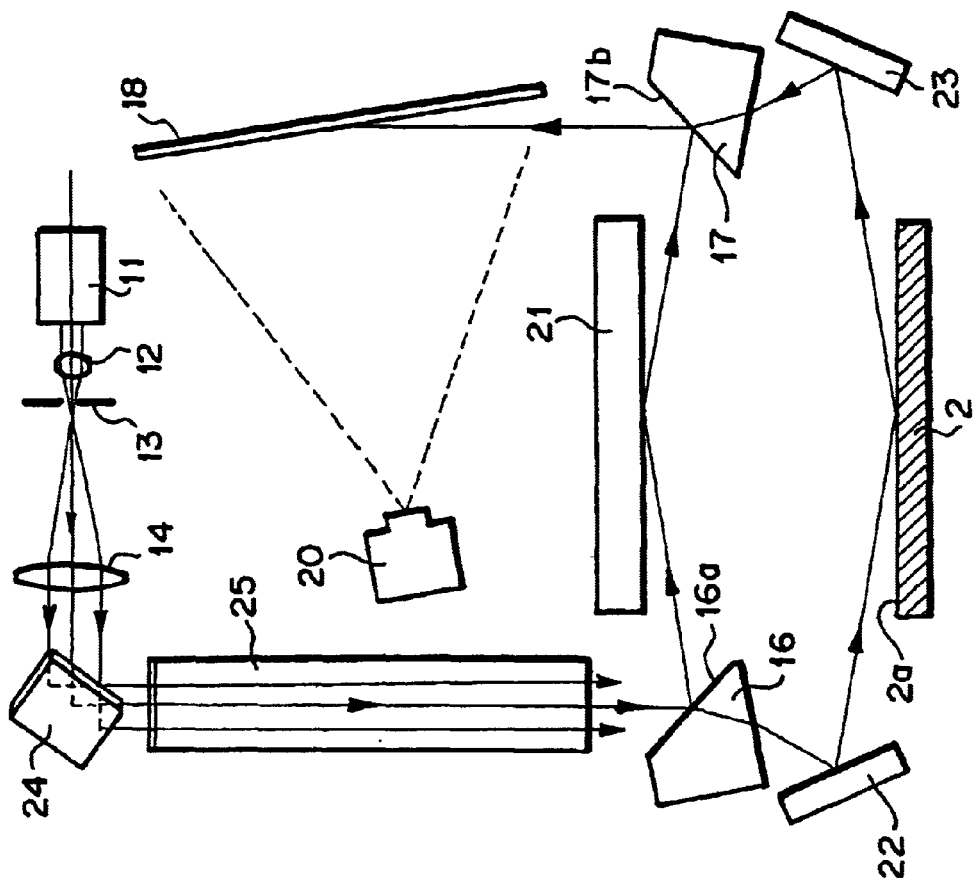
FIGS. 10A and 10B are views showing the configuration of the apparatus using an optical system for an oblique incidence interferometer in accordance with Example 10 of the present invention.

As shown in FIG. 10B, the apparatus of Example 10 is constituted by a semiconductor laser light source 11 for emitting coherent light; an optical system, comprising a condenser lens 12, a pinhole plate 13, a collimator lens 14, a mirror 24, and a luminous flux diameter adjusting prism 25, for turning the light into a parallel light beam bundle having a predetermined luminous flux diameter; the optical system for an oblique incidence interferometer in accordance with this embodiment; and a TV camera 20 disposed at a position where interference fringes formed on an interference fringe observing screen 18 of the latter optical system are viewable.

Figure 10A:
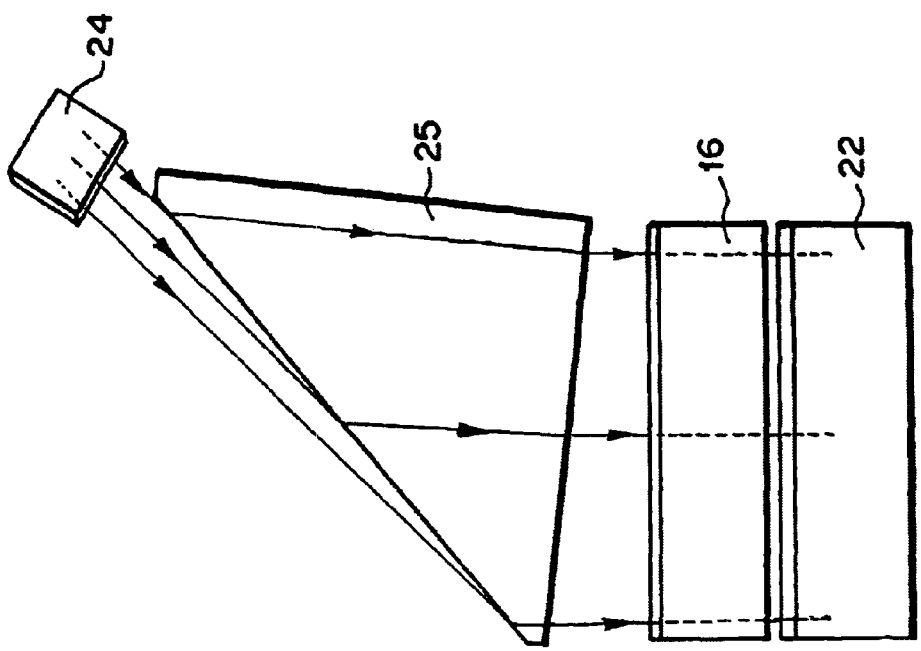
Figure 11B:
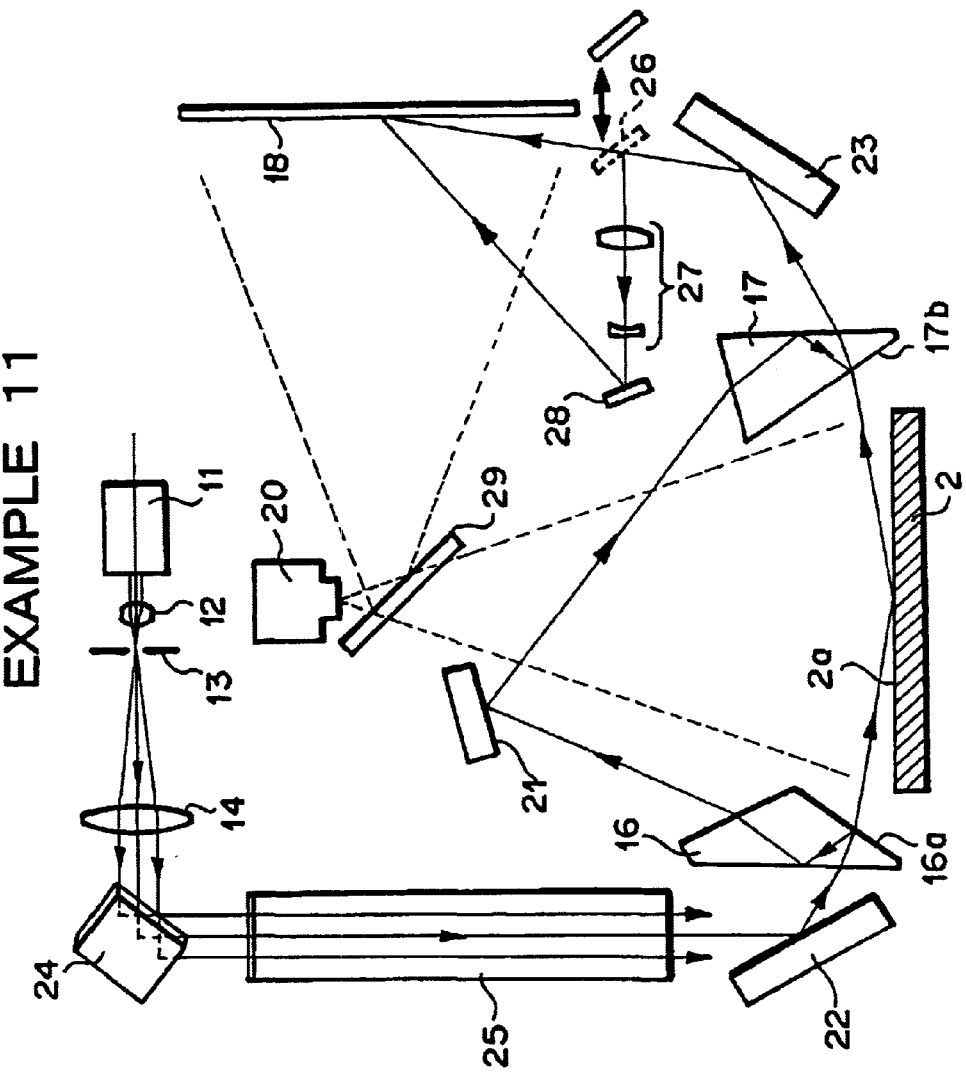
FIGS. 11A and 11B are views showing the configuration of the apparatus using an optical system for an oblique incidence interferometer in accordance with Example 11 of the present invention.
Figure 11A:
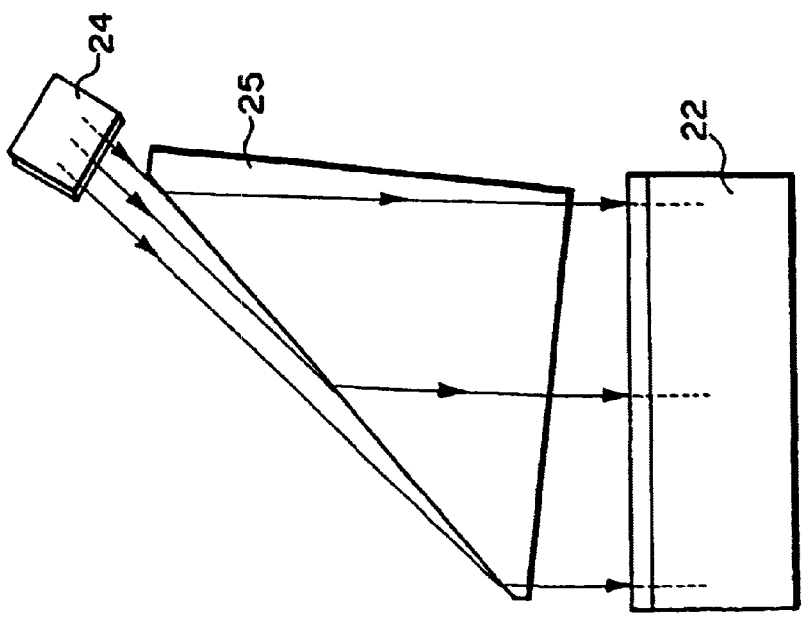

FIG. 10A is a view showing the part of apparatus from the mirror 24 to mirror 22 in FIG. 10B as seen from the left side thereof. If the luminous flux turned into parallel light by the collimator lens 14 is regularly reflected by the mirror 24 so as to be made obliquely incident on the prism 25 as such, then this luminous flux becomes collimated light suitable for this oblique incidence interferometer apparatus. The luminous flux adjusting prism 25 will be explained later in detail with reference to FIGS. 11A and 11B showing Example 11.

The optical system for an oblique incidence interferometer in accordance with this example is mostly common with the optical system explained as Example 7. Namely, this optical system is configured such that the coherent collimated light A is divided into reference light B and measurement light C at a surface where the coherent collimated light A enters the first prism 16, whereas the reference light B and measurement light C are combined together at a surface where the measurement light C exits from the second prism 17. In FIGS. 10A to 13 showing the apparatus, the letters referring to collimated light A, reference light B, and measurement light C are omitted in order to prevent the drawings from being complicated.

At the luminous flux dividing surface 16a of first prism 16, the collimated light A is divided into the measurement light C straightly transmitted therethrough so as to enter the first prism 16, and the reference light B regularly reflected thereby. The measurement light C is transmitted through the first prism 16, and then is successively reflected by the mirror 22, the test surface 2a, and the mirror 23, so as to enter the second prism 17. On the other hand, the reference light B is regularly reflected by the mirror 21, and then is regularly reflected at the luminous flux combining surface 17b of second prism 17, where the reference light B is combined with the measurement light C emitted from the second prism 17, whereby the composite light carrying interference fringe information projects interference fringe images onto the screen 18.

Thus, during the period of time from the dividing at the first prism 16 until the combining at the second prism 17 in this example, the number of reflections is 3 in each of the reference light B and the measurement light C. Since the number of reflections is odd in each of the reference light B and measurement light C, the tolerance for errors in collimated light becomes greater as in Example 1.

The apparatus of this example is configured such that interference fringe images can be viewed through the TV camera 20 as in Example 9. Consequently, as in Example 9, operations and effects such as those mentioned above can be obtained if the field of view of this camera is made variable upon zooming or switching or the apparatus is equipped with an image processing function which evaluates distortions generated by lenses mounted to the camera and then carries out image processing so as to correct the distortions.

EXAMPLE 11

As shown in FIG. 11B, the apparatus of Example 11 is constituted by a semiconductor laser light source 11 for emitting coherent light; an optical system, comprising a condenser lens 12, a pinhole plate 13, a collimator lens 14, a mirror 24, and a luminous flux diameter adjusting prism 25, for turning the light into a parallel light beam bundle having a predetermined luminous flux diameter; optical path deflecting mirrors 22 and 23; the optical system for an oblique incidence interferometer in accordance with this embodiment; a TV camera 20 disposed at a position where interference fringes formed on an interference fringe observing screen 18 of the latter optical system are viewable; an alignment imaging optical system comprising an alignment mirror 26 detachably insertable in the optical path, an imaging lens 27, and a mirror 28; and a switching mirror 29 for changing the field of view of the TV camera 20.

The optical system for an oblique incidence interferometer in accordance with this example is mostly common with the optical system explained as Example 1. Namely, this optical system is configured such that the coherent collimated light A is divided into reference light B and measurement light C at a surface where the coherent collimated light A exits from the first prism 16, whereas the reference light B and measurement light C are combined together at a surface where the measurement light C enters the second prism 17. In the optical path of reference light B, a mirror 21 is disposed.

At the luminous flux dividing surface 16a, the collimated light A incident on the first prism 16 is divided into the measurement light C straightly transmitted and emitted therethrough, and the reference light B regularly reflected within the prism 16. The measurement light C is reflected by the test surface 2a, so as to enter the second prism 17. On the other hand, the reference light B is regularly reflected once again within the prism 16, so as to be emitted therefrom. Thus emitted reference light B is regularly reflected by the mirror 21, so as to enter the second prism 17. After being regularly reflected once within the second prism 17 and then once regularly reflected by the luminous flux combining surface 17b, the reference light B is combined with the measurement light C straightly transmitted through this surface, whereby the composite light carrying interference fringe information projects interference fringe images onto the screen 18.

Thus, during the period of time from the dividing at the first prism 16 until the combining at the second prism 17 in this example, the number of reflections is 5 for the reference light B, and 1 for the measurement light C. Since the number of reflections is odd in each of the reference light B and measurement light C, the tolerance for errors in collimated light becomes greater as in Example 1.

In this example, the detachable mirror 26 for guiding the luminous flux from the second prism 17 to the alignment imaging lens 27 is disposed between the second prism 17 and interference fringe observing screen 18. This mirror 26 is made movable, and is inserted in the optical path when adjusting the alignment of sample 2.

At the time of alignment, the light emitted from the second prism 17 is guided by the mirror 26 to the alignment imaging lens 27. The alignment screen 18 is disposed at the focal plane of imaging lens 27, and alignment is carried out while the spot image formed by the imaging lens 27 is being observed. In this example, without separately providing the alignment screen 18, the optical path is deflected by the mirror 28, such that the spot image can be observed on the interference fringe observing screen 18. If the test surface 2a is tilted, then the spot image formed by the measurement light and the spot image formed by the reference light shift from each other upon viewing. Therefore, alignment is carried out such that the two spot images are superposed on each other so as to be seen as one. Thus, the alignment of test surface 2a becomes easier. The mirror 26 may be used so as to block a part of the luminous flux of composite light having generated interference, such that thus blocked part of the luminous flux is utilized for alignment, whereas the remaining unblocked luminous flux forms interference fringes on the screen 18. In this case, alignment can be carried out while the state of interference fringes is being observed.

While the mirror 26 is a member for guiding the luminous flux from the second prism 17 to the alignment imaging lens 27, other members may be used in place of the mirror so as to guide the luminous flux to the alignment imaging lens 27. For example, optical path separating means such as a half mirror can be used.

Thus, this example is configured such that the alignment screen 18 is also used as the interference fringe observing screen 18, so that the two spot images and interference fringes can be observed simultaneously, whereby the number of members can be made smaller in a compact configuration. However, a separate screen may be provided for alignment, or light can directly be received by an imaging device.

In the optical system of this example, as shown in FIG. 11B, members such as the prisms 16, 17 are arranged such that the mirror 21 shifts to the left side in the drawing without opposing the test surface 2a as compared with the optical system of Example 1. As a consequence, a sufficient space can be secured above the test surface 2a in the drawing, whereby it becomes easier to directly view the test surface 2a.

Since the optical system is arranged as such, the field of view of TV camera 20 can be changed by the switching mirror 29 so as to capture the interference fringe observing screen 18 and the test surface 2a. The switching mirror 29 is made movable. It is inserted at the depicted position when viewing the interference fringe observing screen 18, and is removed from the field of view of TV camera 20 when viewing the test surface 2a. If the interference fringe observing screen 18 and the test surface 2a are made viewable by the single TV camera 20, then it becomes possible to cut down the cost and make the whole apparatus compact.

While the switching mirror 29 may be formed as a mirror detachably inserted between the TV camera 20 and the interference fringe observing screen 18 so as to selectively view one of the fields of view as in this example, a half mirror may be disposed at this position in place of the switching mirror so as to view the interference fringe observing screen 18 and the test surface 2a simultaneously.

The apparatus of this example is configured such that the interference fringe images can be viewed by the TV camera 20 as in Example 9. Therefore, the field of view of this camera may be made variable upon zooming or switching, or the apparatus may be equipped with an image processing function which evaluates distortions generated by lenses mounted to this camera and then carries out image processing so as to correct the distortions, whereby operations and effects such as those mentioned above can be obtained.

FIG. 11A is a view showing the part of apparatus from the mirror 24 to mirror 22 in FIG. 11B as seen from the left side thereof. If the luminous flux turned into parallel light by the collimator lens 14 is thus made obliquely incident on the prism 25 from the mirror 24, then this luminous flux becomes collimated light suitable for this oblique incidence interferometer apparatus.

As depicted, the prism 25 is a block having a cross section shaped like a regular isosceles triangle, while being flat in the direction along which two surfaces each shaped like the regular isosceles triangle oppose each other. The prism 25 is positioned such that the parallel luminous flux from the mirror 24 is made obliquely incident in the longitudinal direction of the oblique surface of prism 25.

If the prism 25 is disposed between the mirrors 24 and 22 as depicted, then the luminous flux can be enlarged perpendicular to the drawing surface in the light exit surface of prism 25 in FIG. 11B.

In the case of an oblique incidence interferometer, while the luminous flux width in the direction (sidewise direction of FIG. 11B, referred to as Z direction) of a plane including the incident light beam to the test surface and the reflected light beam therefrom may be smaller since it is enlarged upon oblique incidence, a luminous flux having a width covering the that of the test surface is required to be made incident in the direction (depth direction of FIG. 11B, referred to as X direction) orthogonal to the above-mentioned plane. If collimated light is made incident on the first prism 16 by way of a normal collimator lens, then the collimator lens must have a larger aperture in order to yield a sufficient luminous flux width in the X direction, so that the lens has a longer focal length, whereby it becomes difficult to make the whole apparatus smaller. For example, if the X-direction width of test surface 2a is 100 mm, then the luminous flux width caused by the collimator lens is required to be 115 to 120 mm. Here, if the F-number of collimator lens is 4, then a lens having a focal length of 400 to 500 mm is necessary.

In this example, since the prism 25 is disposed between the collimator lens and the luminous flux dividing surface such that the luminous flux is enlarged only in one direction by the refracting action of the prism, the diameter of collimator lens can be made smaller, and its focal length can be made shorter, whereby the apparatus as a whole can be made smaller.

Conventionally, light outputted from a laser has been enlarged so as to match the X-direction width of test surface. If this luminous flux is made obliquely incident on the test surface, then the luminous flux is enlarged wider than the Z-direction width of test surface, whereby only a part of collimated light irradiates the test surface, thus losing the quantity of light. In this example, in view of the fact that the measurement light C is made obliquely incident on the test surface 2a in a later stage so as to be enlarged only in the Z direction, the luminous flux of light outputted from the light source 11 is enlarged by the prism 25 beforehand only in the X direction so as to match the X-direction width of test surface, whereby light utilization efficiency can be enhanced.

For further enhancing the luminous flux by means of the prism 25, it is necessary that the angle of incidence with respect to the enlarging prism 25 be made as large as possible (see FIG. 11A). If the incidence angle is set larger to the depicted extent, then S-polarized light becomes considerably easier to reflect, whereby a greater amount of P-polarized light component is found in the light transmitted through the prism upon refraction. The P-polarized light component transmitted through the prism 25 is made incident on the test surface 2a after being reflected by the mirror 22, whereby it is converted into the S-polarized light component so as to be made obliquely incident on the test surface 2a. In the oblique incidence configuration mentioned above, the S-polarized light component is more likely to be reflected, whereby it is advantageous in that the reflection efficiency at the test surface 2a is improved. Even when the reflection efficiency is favorable, the quantity of reflected light from the test surface 2a is not on a par with the quantity of reference light, whereby it is more desirable that the light incident on the prism 25 per se be light having a greater amount of P-polarized light component.

EXAMPLE 12

FIG. 12B shows the configuration of the apparatus in accordance with Example 12. In this apparatus, the part of optical system for an oblique incidence interferometer is mostly common with the optical system explained as Example 9, whereas light quantity regulating filters 30B and 30C are disposed in addition thereto. The overall configuration of the apparatus is mostly common with the apparatus explained as Example 11.

This optical system is configured such that the coherent collimated light A is divided into reference light B and measurement light C at a surface where the coherent collimated light A enters the first prism 16, whereas the reference light B and measurement light C are combined together at a surface where the measurement light C exits from the second prism 17.

At the luminous flux dividing surface 16a of first prism 16, the collimated light A is divided into the measurement light C straightly transmitted therethrough so as to enter the first prism 16, and the reference light B regularly reflected thereby. The measurement light C is once regularly reflected within the first prism 16, and then is reflected by the test surface 2a, so as to enter the second prism 17. After being regularly reflected within the second prism 17, the measurement light is directed to the luminous flux combining surface 17b. On the other hand, the reference light B is regularly reflected by the mirror 21, and then is regularly reflected at the luminous flux combining surface 17b of second prism 17, where the reference light B is combined with the measurement light C emitted from the second prism 17, whereby the composite light carrying interference fringe information projects interference fringe images onto the screen 18.

Thus, during the period of time from the dividing at the first prism 16 until the combining at the second prism 17 in this example, the number of reflections is 3 in each of the reference light B and the measurement light C. Since the number of reflections is odd in each of the reference light B and measurement light C, the tolerance for errors in collimated light becomes greater as in Example 1.

On the other hand, this example is configured such that, as in Example 9, the reference light B and measurement light C have optical path lengths substantially equal to each other after being divided at the first prism 16 until they are combined together at the second prism 17. As a consequence, this example also has a configuration effective even when light having a lower coherence is used as the light source for measurement.

Also, in the optical system for an oblique incidence interferometer in accordance with this embodiment, the filters 30B and 30C having light quantity adjusting functions are disposed in the respective optical paths of reference light B and measurement light C from the first prism 16 to the second prism 17. The filters 30B and 30C function to adjust the light quantity of the measurement light C reflected at the test surface 2a and that of the reference light B such that they are substantially on a par with each other. If such filters 30B and 30C are arranged, the optical system can respond to test surfaces 2a having a variety of surface accuracy and reflectivity.

While oblique incidence interferometers are required to have a function for favorably viewing rough surfaces whose reflectivity is not so high as well, if the reflectivity of test surface 2a is low, then the quantity of reference light B is likely to become larger than that of the measurement light C reflected by the test surface 2a. Here, if there is a remarkable difference in light quantity between the reference light B and measurement light C, then the resulting interference fringes exhibit a lower contrast, whereby the accuracy in measurement deteriorates. Since the light quantity adjusting filters 30B and 30C are arranged, this example makes it possible to accurately measure the test surface 2a ranging from a mirror surface to a rough surface with a low reflectivity.

The filters 30B, 30C having the light quantity adjusting function adjust the light quantity of reference light B and that of measurement light C such that they become substantially on a par with each other. Such a filter may also be disposed in at least one of the optical paths of reference light B and measurement light C from the first prism 16 to the second prism 17.

The apparatus of this example will now be explained. The apparatus of this example has a configuration substantially the same as that of the optical system explained as Example 1, but differs therefrom in three points; i.e., that the luminous flux diameter adjusting prism in this example is divided into two prisms 25a and 25b; that the luminous flux emitted from the luminous flux diameter adjusting prism 25b in this example directly enters the first prism 16 without the aid of mirrors; and that this example is equipped with neither the alignment optical system nor its accompanying members.

Therefore, the apparatus of this example can attain operations and effects similar to those of Example 11, and modes can be changed similarly.

Namely, the apparatus of this example is also configured such that interference fringe images are viewable by the TV camera 20. Therefore, as in Example 9, the field of view of this camera may be made variable upon zooming or switching, or the apparatus may be equipped with an image processing function which evaluates distortions generated by lenses mounted to this camera and then carries out image processing so as to correct the distortions, whereby operations and effects such as those mentioned above can be obtained.

Also, in the optical system of this example, members such as the prisms 16, 17 are arranged such that the mirror 21 shifts to the left side of the drawing without opposing the test surface 2a. Such an arrangement not only makes the optical path lengths of reference light B and measurement light C substantially equal to each other from the dividing until the combining, but also secures a sufficient space above the test surface 2a in the drawing, thereby making it easier to directly view the test surface 2a.

Therefore, the TV camera 20 can capture the interference fringe observing screen 18 and the test surface 2a by changing the field of view with the switching mirror 29 in this example as well. When the single TV camera 20 can view the interference fringe observing screen 18 and test surface 2a, it becomes possible to cut down the cost and make the whole apparatus compact.

FIG. 12A is a view showing the part of apparatus from the mirror 24 to mirror 22 in FIG. 12B as seen from the left side thereof. As in the apparatus of Example 10, if the luminous flux turned into parallel light by the collimator lens 14 is thus made obliquely incident on the prism 25a from the mirror 24, and also made obliquely incident on the prism 25b in a later stage, then this luminous flux becomes collimated light suitable for this oblique incidence interferometer apparatus.

Since the two prisms 25a, 25b are employed in place of the collimating prism 25, the degree of freedom in the luminous flux diameter adjustment can be enhanced, and the mass of prisms in total can be lowered.

EXAMPLE 13

Figure 13:
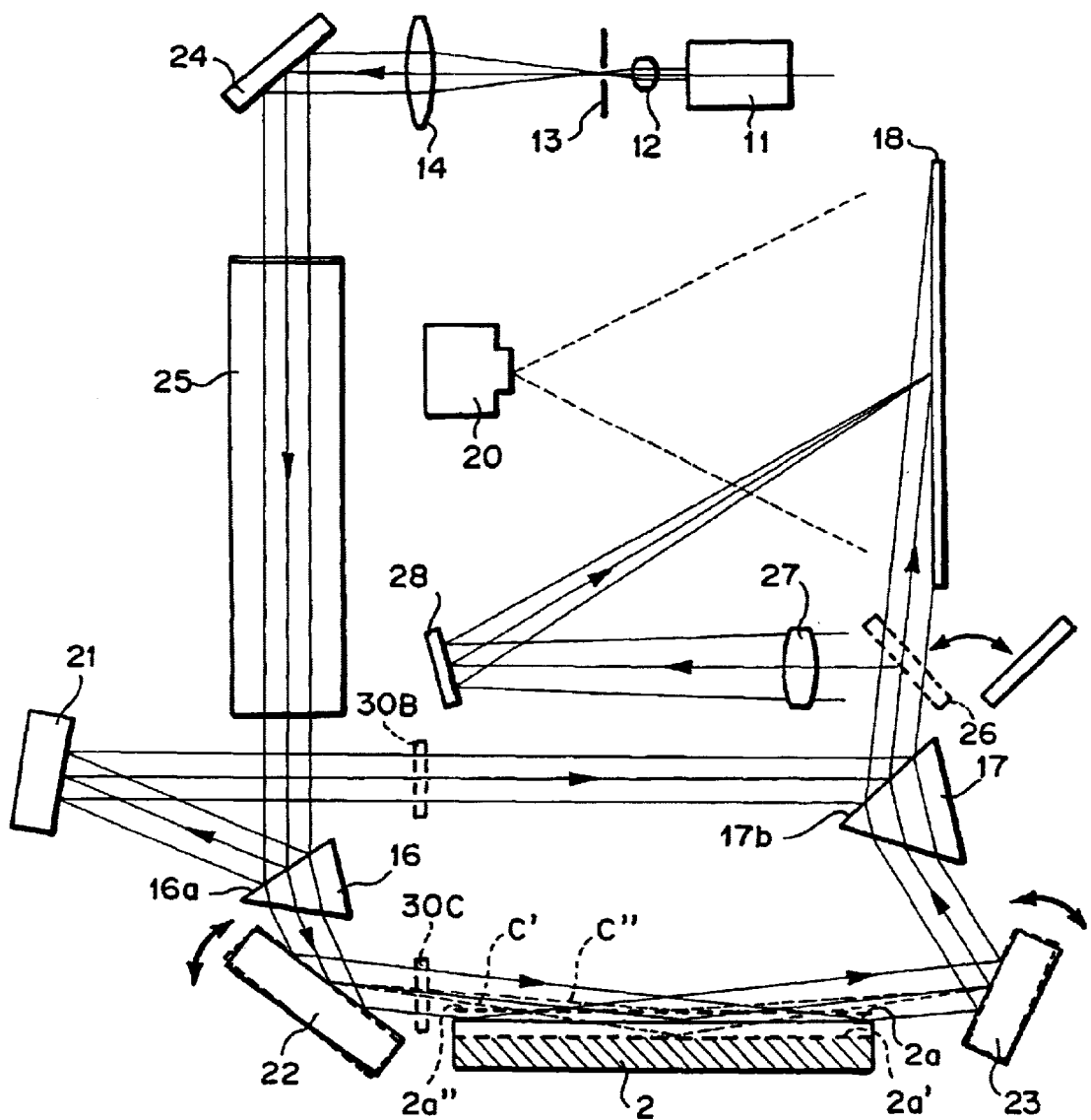
FIG. 13 is a view showing the configuration of the apparatus using an optical system for an oblique incidence interferometer in accordance with Example 13 of the present invention.
Figure 14:
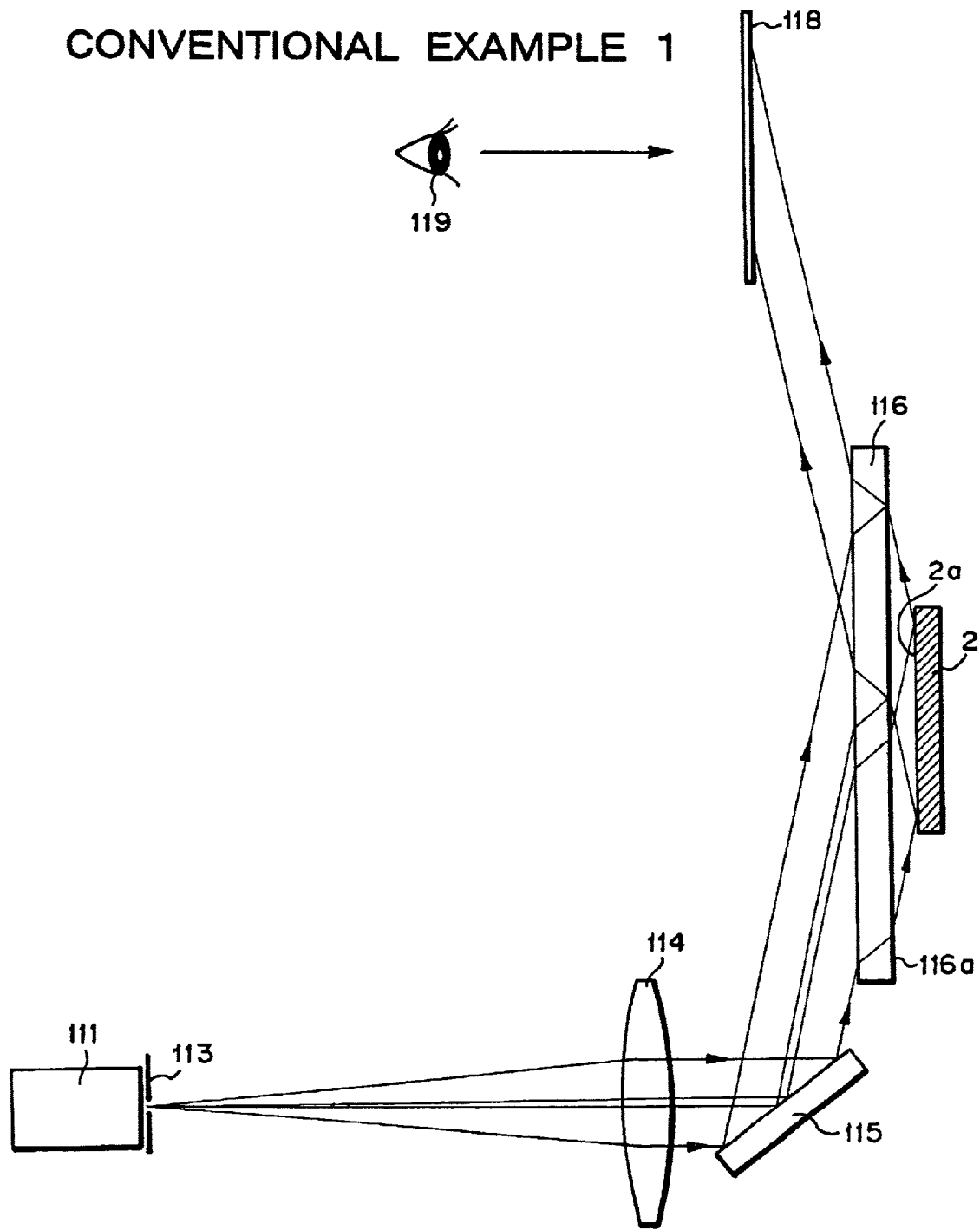
FIG. 14 is a view showing the configuration of a first conventional oblique incidence interferometer apparatus.
Figure 15:
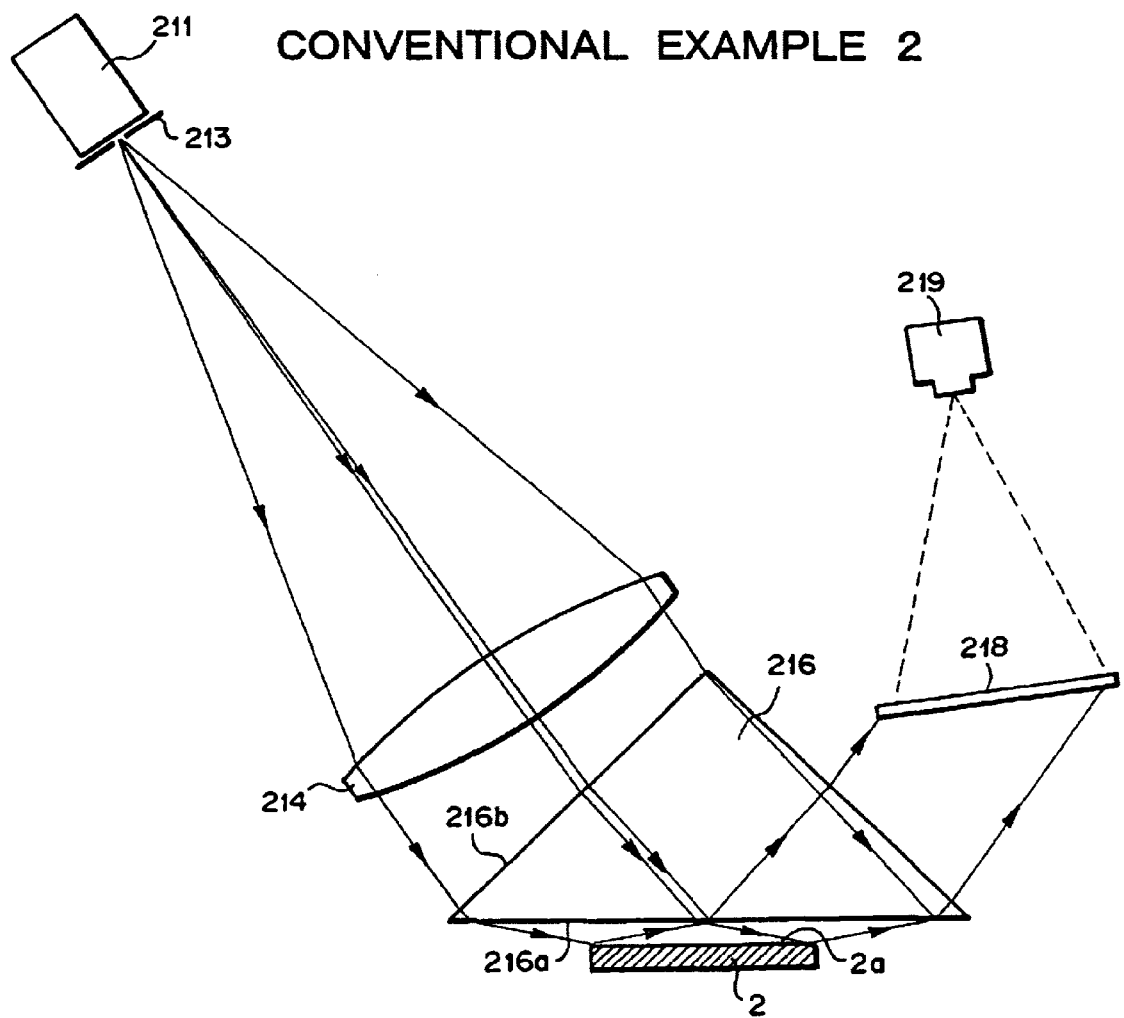
FIG. 15 is a view showing the configuration of a second conventional oblique incidence interferometer apparatus.
Figure 16:
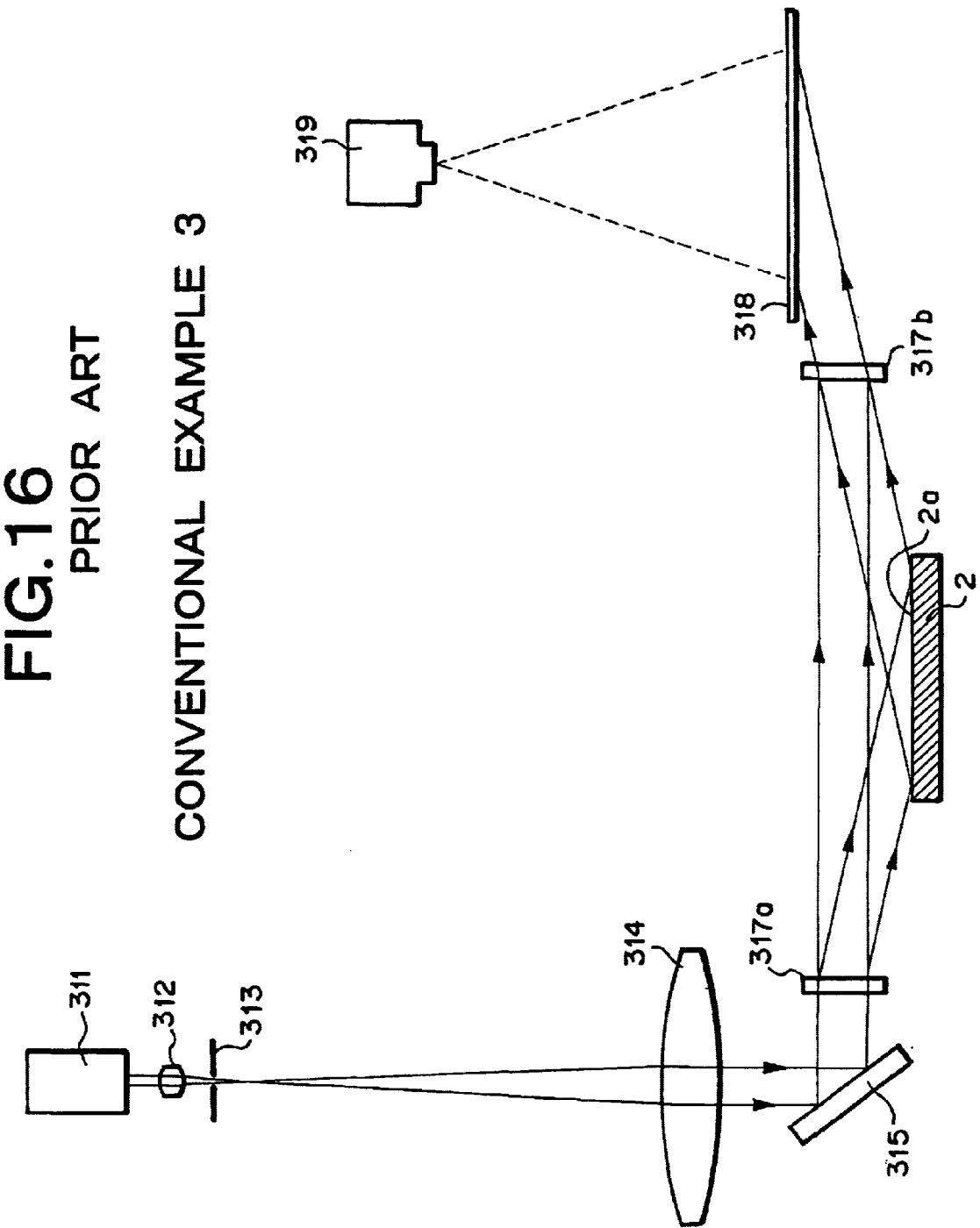
FIG. 16 is a view showing the configuration of a third conventional oblique incidence interferometer apparatus.
Figure 17:
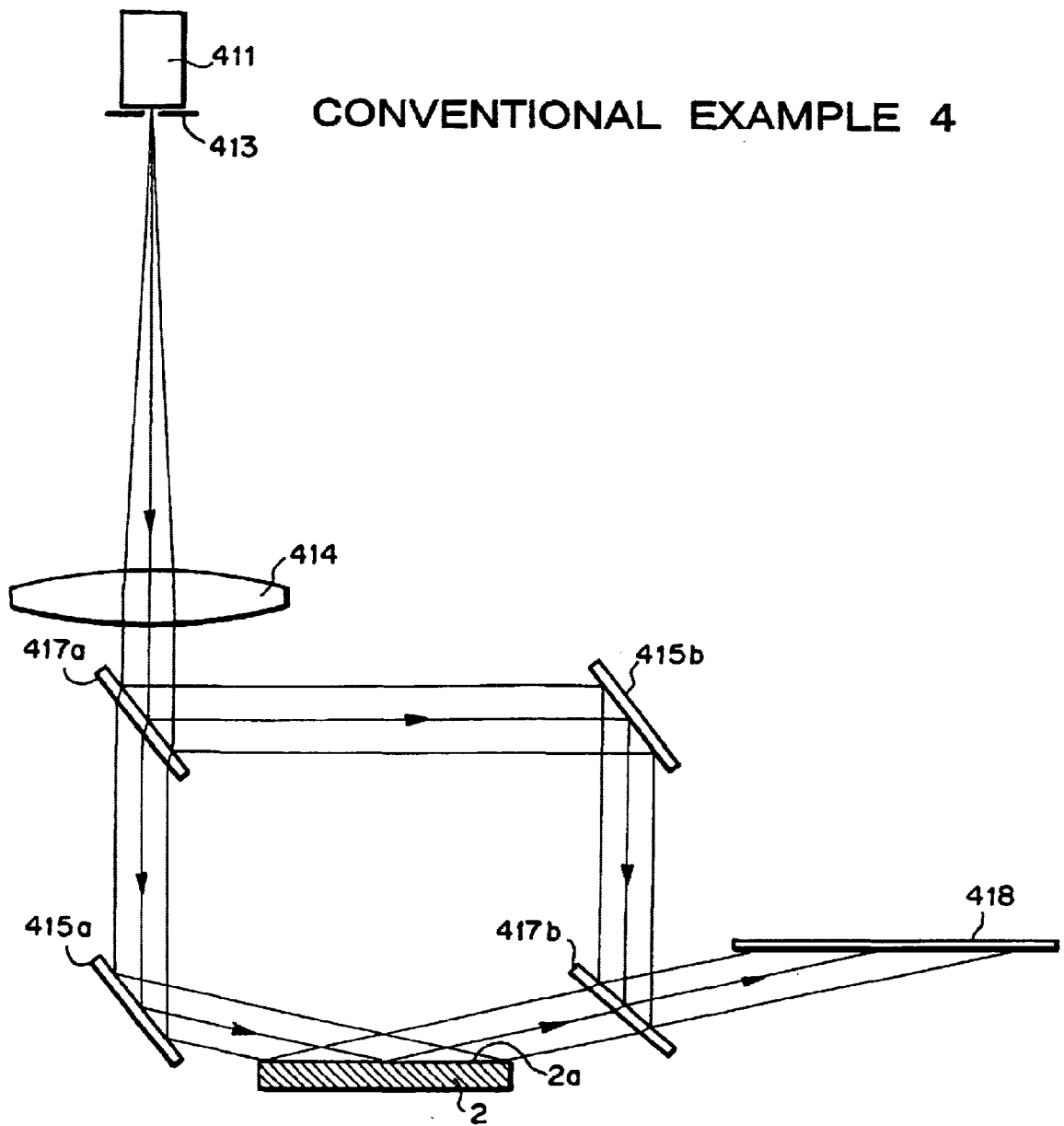
FIG. 17 is a view showing the configuration of a fourth conventional oblique incidence interferometer apparatus.

The configuration of the apparatus in accordance with Example 13 is shown in FIG. 13. The part of optical system for an oblique incidence interferometer is mostly common with the optical system explained as Example 9. On the other hand, the overall configuration of the apparatus is mostly common with the apparatus explained as Example 11.

This optical system is configured such that the coherent collimated light A is divided into reference light B and measurement light C at a surface where the coherent collimated light A enters the first prism 16, whereas the reference light B and measurement light C are combined together at a surface where the measurement light C exits from the second prism 17.

At the luminous flux dividing surface 16a of first prism 16, the collimated light A is divided into the measurement light C straightly transmitted therethrough so as to enter the first prism 16, and the reference light B regularly reflected thereby. The measurement light C is transmitted through the first prism 16 and is successively reflected by the mirror 22, the test surface 2a, and the mirror 23, so as to enter the second prism 17. On the other hand, the reference light B is regularly reflected by the mirror 21, and then is regularly reflected at the luminous flux combining surface 17b of second prism 17, where the reference light B is combined with the measurement light C emitted from the second prism 17, whereby the composite light carrying interference fringe information projects interference fringe images onto the screen 18.

Thus, during the period of time from the dividing at the first prism 16 until the combining at the second prism 17 in this example, the number of reflections is 3 in each of the reference light B and the measurement light C. Since the number of reflections is odd in each of the reference light B and measurement light C, the tolerance for errors in collimated light becomes greater as in Example 1.

On the other hand, this example is configured such that, as in Example 9, the reference light B and measurement light C have optical path lengths substantially equal to each other after being divided at the first prism 16 until they are combined together at the second prism 17. As a consequence, this example also has a configuration effective even when light having a lower coherence is used as the light source for measurement.

Also, in the optical system for an oblique incidence interferometer in accordance with this embodiment, the filters 30B and 30C having light quantity adjusting functions for adjusting the light quantity of the measurement light C reflected at the test surface 2a and that of the reference light B such that they are substantially on a par with each other are disposed in the respective optical paths of reference light B and measurement light C from the first prism 16 to the second prism 17 as in Example 12. If such filters 30B and 30C are arranged, then the optical system can respond to test surfaces 2a having a variety of surface accuracy and reflectivity.

In this example, as in Example 8, a rotatable mirror 22 for changing the incident angle is disposed such that the angle at which the measurement light C is incident on the test surface 2a can be changed, whereas a mirror 23 is disposed as an optical path adjusting means for adjusting the optical path such that interference fringes are formed at a predetermined position of the interference fringe observing screen 18 in response to the change in incident angle of the measurement light C onto the test surface 2a caused by the mirror 22. Unlike Example 8, however, the mirror 22 is positioned downstream the first prism 16, whereas the mirror 22 is positioned in the optical path of measurement light C downstream the test surface 2a.

If the angle at which the measurement light C is incident on the test surface 2a is changed as such, then the sensitivity of the interference fringes formed by this optical system can be made variable, whereby the optical system can respond to test surfaces 2a having a variety of surface accuracy.

The mirror 22 is made rotatable as indicated by arrows in FIG. 13, whereby the incident angle with respect to the test surface 2a is changed. Two traces of measurement light C obtained when the mirror 22 is rotated are indicated by broken lines C' and C". Here, the sample 2 is adjusted such that the test surface 2a is moved to the position indicated by the broken line 2a' or 2a" so as to correspond to the measurement light C' or C". In this example, since the mirror 22 is located in the optical path of measurement light C downstream the first prism 16, the optical path of reference light B is unchanged.

It is desirable that members downstream the test surface 2a be movable in response to the change in optical path of the measurement light C when necessary. For example, in this example, the mirror 23 is rotatable as indicated by arrows in FIG. 13. If the position and orientation of mirror are changed as such, then the measurement light C can be made incident on the second prism 17 at a predetermined angle of incidence even when the optical path of the measurement light C reflected by the test surface 2a is changed upon rotating the mirror 22, whereby the interference fringe images formed when the reference light B and measurement light C are combined together can be projected onto the screen 18 without moving the latter.

Thus, in this example, viewing can be carried out while changing the fringe sensitivity, and the interference fringe images can be formed and viewed at a predetermined position on the screen 18 even when the fringe sensitivity changes.

In this example, as in Example 11, an alignment imaging optical system comprising a mirror 26 detachably insertable in the optical path for guiding the luminous flux from the second prism 17 to an alignment imaging lens 27, the imaging lens 27, and a mirror 28 is provided between the second prism 17 and the interference fringe observing screen 18. The mirror 26 is movable as in the optical system of Example 11, and is inserted into the optical path upon the alignment adjustment of sample 2. The spot image formed by the imaging lens 27 is viewed on the interference fringe observing screen 18 in this example as well. Thus, this example is also configured such that the alignment of test surface 2a can be carried out easily. Also, the alignment can be carried out while the state of interference fringes is being observed.

The modes concerning the mirror 26 and alignment screen 18 can also be modified in this example as in the alignment imaging optical system of Example 11.

The apparatus of this example will now be explained. The apparatus of this example has a configuration substantially the same as that of the optical system explained as Example 11, but differs therefrom in two points, i.e., that the luminous flux emitted from the luminous flux diameter adjusting prism 25 in this example is directly made incident on the first prism 16 without the aid of mirrors; and that no switching mirror 29 is provided.

Therefore, the apparatus of this example can attain operations and effects similar to those of Example 11, and modes can be changed similarly.

Namely, the apparatus of this example is also configured such that interference fringe images are viewable by the TV camera 20. Therefore, as in Example 9, the field of view of this camera may be made variable upon zooming or switching, or the apparatus may be equipped with an image processing function which evaluates distortions generated by lenses mounted to this camera and then carries out image processing so as to correct the distortions, whereby operations and effects such as those mentioned above can be obtained.

The optical system for an oblique incidence interferometer and the apparatus in accordance with the present invention are not restricted to those of the above-mentioned embodiment, and may be modified in various manners. For example, as the forms of the first prism as luminous flux dividing means and the second prism as luminous flux combining means, the forms (including those having a pentagonal or higher polygonal cross section) other than those shown in the above-mentioned embodiment may be employed as appropriate.

Also, mirrors may be disposed at predetermined positions other than those shown in the above-mentioned embodiment so as to arrange optical paths at their optimal positions in view of the spaces for disposing the optical system and apparatus.

Though the number of reflections in each of the reference light and measurement light is set to an odd number in the above-mentioned embodiment, similar operations and effects can also be obtained when the number of reflections is set to an even number for each of them.

As explained in the foregoing, the optical system for an oblique incidence interferometer in accordance with the present invention comprises a first prism as luminous flux dividing means and a second prism as luminous flux combining means; and is configured such that reference light and measurement light are separated from each other at a surface where coherent light enters the first prism or exits therefrom, whereas the reference light and measurement light are combined together at a surface where the measurement light enters the second prism or exits therefrom. The apparatus using the optical system for an oblique incidence interferometer in accordance with the present invention comprises the optical system for an oblique incidence interferometer and a camera.

By using respective prisms as the luminous flux dividing means and luminous flux combining means contrary to the conventional idea, the present invention enables the optical system and the whole apparatus to be made compact while reducing the light quantity loss and interference noise, making it easier to view interference fringes, and facilitating the alignment.

What is claimed is:

1. An optical system for an oblique incidence interferometer, in which collimated coherent light is divided by luminous flux dividing means, one of thus obtained luminous fluxes is used as reference light, the other luminous flux is used as measurement light made obliquely incident on a test surface, said reference light and said measurement light reflected by said test surface are combined together by luminous flux combining means so as to interfere with each other, and thus generated interference fringes are formed on an interference fringe observing screen;

wherein said luminous flux dividing means comprises a first prism, said reference light and measurement light being separated from each other at a surface where said coherent light enters said first prism or a surface where said coherent light exits from said first prism; and wherein said luminous flux combining means comprises a second prism, said reference light and measurement light being combined together at a surface where said measurement light enters said second prism or a surface where said measurement light exits from said second prism.

2. An optical system for an oblique incidence interferometer according to claim 1, wherein said first and second prisms are each constituted by a single prism.

3. An optical system for an oblique incidence interferometer according to claim 1, wherein a rotatable mirror for changing an incident angle is disposed upstream or downstream said first prism such that an angle at which said measurement light is incident on said test surface can be changed.

4. An optical system for an oblique incidence interferometer according to claim 3, wherein optical path adjusting means is disposed in an optical path of said measurement light downstream said test surface or disposed downstream said second prism, said optical path adjusting means adjusting an optical path such that interference fringes are formed at a predetermined position of said interference fringe observing screen in response to the change in incident angle of said measurement light with respect to said test surface caused by said mirror for changing an incident angle.

5. An optical system for an oblique incidence interferometer according to claim 1, wherein a filter having a light quantity adjusting function is disposed in at least one of optical paths of said reference light and measurement light from said first prism to said second prism.

6. An optical system for an oblique incidence interferometer according to claim 1, wherein said reference light and said measurement light have respective optical path lengths which are substantially equal to each other after said dividing at said first prism until said combining at said second prism.

7. An optical system for an oblique incidence interferometer according to claim 1, wherein the number of reflections is an even or odd number in both of said reference light and measurement light from said dividing at said first prism until said combining at said second prism.

8. An optical system for an oblique incidence interferometer according to claim 1, wherein a mirror for guiding a luminous flux from said second prism to an imaging lens is disposed between said second prism and said interference fringe observing screen; and wherein an alignment screen is disposed at a focal plane of said imaging lens.

9. An optical system for an oblique incidence interferometer according to claim 8, wherein said alignment screen is also used as said interference fringe observing screen.

10. An optical system for an oblique incidence interferometer according to claim 1, wherein said luminous flux dividing means and said luminous flux combining means are disposed such that said test surface is directly viewable.

11. An apparatus comprising the optical system for an oblique incidence interferometer according to claim 1, and a camera disposed at a position where said interference fringes formed on said interference fringe observing screen is viewable.

12. An apparatus according to claim 11, wherein said camera has a field of view variable upon zooming or switching.

13. An apparatus according to claim 11, wherein a switching mirror or half mirror is disposed between said camera and said interference fringe observing screen such that said test surface is directly viewable by said camera.

14. An apparatus according to claim 11, wherein said apparatus is equipped with an image processing function which evaluates a distortion generated by a lens mounted to said camera and then carries out image processing so as to correct said distortion.

* * * * *